United States Patent
Fukuoka et al.

[11] Patent Number: 5,206,474
[45] Date of Patent: Apr. 27, 1993

[54] WELD LINE PROFILE CONTROL METHOD

[75] Inventors: Hisahiro Fukuoka; Hirotoshi Watanabe; Shunji Iwaki; Kazumasa Yoshima, all of Takarazuka, Japan

[73] Assignee: Shin Meiwa Industry Co., Ltd., Nishinomiya, Japan

[21] Appl. No.: 651,418

[22] PCT Filed: Jun. 6, 1990

[86] PCT No.: PCT/JP90/00741
§ 371 Date: Apr. 4, 1991
§ 102(e) Date: Apr. 4, 1991

[87] PCT Pub. No.: WO90/15686
PCT Pub. Date: Dec. 27, 1990

[30] Foreign Application Priority Data
Jun. 14, 1989 [JP] Japan .................. 1-151081
Jul. 10, 1989 [JP] Japan .................. 1-178541

[51] Int. Cl.$^5$ .......................... B23K 9/127
[52] U.S. Cl. .................. 219/124.34; 219/125.12
[58] Field of Search .............. 219/125.12, 124.22, 219/124.34

[56] References Cited

U.S. PATENT DOCUMENTS
4,491,718  1/1985  Cook et al. ............ 219/124.22
4,670,642  6/1987  Sugitani et al. ........ 219/125.12

FOREIGN PATENT DOCUMENTS
61-33775   2/1986  Japan .
61-17590   5/1986  Japan .
61-88975   5/1986  Japan .
63-29627   6/1988  Japan .

*Primary Examiner*—Clifford C. Shaw
*Attorney, Agent, or Firm*—Oblon, Spivak, McClelland, Maier & Neustadt

[57] ABSTRACT

The present invention is directed to a weld line profile control method in weaving welding. According to this method, a welding current and/or a welding voltage in a position close to a weaving endpoint is evaluated as a reference value. A welding current and/or a welding voltage in the vicinity of an n-th ($n \geq 2$) weaving endpoint are actually measured respectively, and thereafter an (n+1)-th weaving endpoint position is evaluated on the basis of difference between the actually measured value and the reference value. Further, welding from the n-th weaving endpoint to an (n+1)-th weaving endpoint is executed on the basis of the positional data. As the result, neither too much nor too little weaving welding can be performed.

6 Claims, 17 Drawing Sheets

FIG.3

| STEP No. | POINT OF POSITIONAL INFORMATION | L,C,As OR S | SEM No. | VELO-CITY V | WELDING CONDITION W No. | FUNCTION F No. | CORRECTION SYSTEM AUX No. |
|---|---|---|---|---|---|---|---|
| 1 | $P_0$ | L | | $V_0$ | | | |
| 2 | $P_0$ | S | 99 | | | | |
| 3 | $P_1$ | L | | $V_0$ | | | |
| 4 | $P_1$ | S | 90 | | | | |
| 5 | $P_2$ | L | | $V_0$ | | | |
| 6 | $P_2$ | S | 90 | | | | |
| 7 | $P_3$ | L | | $V_0$ | | | |
| 8 | $P_4$ | L | | $V_0$ | | | |
| 9 | $P_4$ | S | 01 | | | | |
| 10 | $P_5$ | As | 01 | | 01 | | 98 |
| 11 | $P_6$ | As | 01 | | | 7 | 02 |
| 12 | $P_7$ | As | | | | | 98 |
| 13 | $P_8$ | L | | | | | |

FIG. 13

| STEP No. | POINT OF POSITIONAL INFORMATION | L.C.As OR S | S E M No. | VELO-CITY V | WELDING CONDITION W No. | FUNCTION F No. | CORRECTION SYSTEM AUX No. |
|---|---|---|---|---|---|---|---|
| 1 | $P_0$ | L | | $V_0$ | | | |
| 2 | $P_0$ | S | 99 | | | | |
| 3 | $P_1$ | L | | $V_0$ | | | |
| 4 | $P_1$ | S | 01 | | | | |
| 5 | $P_2$ | L | | | | | |
| 6 | $P_3$ | As | 01 | | 01 | | 98 |
| 7 | $P_4$ | As | 01 | | | 7 | 02 |
| 8 | $P_5$ | As | | | | | 98 |
| 9 | $P_6$ | L | | | | | |

WELD LINE PROFILE CONTROL METHOD

FIELD OF THE INVENTION

The present invention relates to a weld line profile control method, and more particularly, it relates to a weld line profile control method of controlling a welding robot to thereby perform weaving.

BACKGROUND OF THE INVENTION

One of important functions of a welding robot is weaving welding. As is well known in the art, this weaving welding is a welding method of moving a welding torch along a weld line while swinging the same in a direction substantially perpendicular to the weld line.

As to workpieces (called "welded bodies" in this specification, and two welded bodies to be welded with each other are expressed by "first" and "second" respectively) serving as targets of welding, butt spaces between first and second welded bodies, groove widths and the like (these are generically named as "interspaces" between the welded bodies in this specification) are frequently nonuniform in the weld line direction because of dispersion of respective ones of cutting accuracy, bending accuracy and assembling accuracy caused by bend and distortion of materials and integrated errors thereof. Therefore, if weaving welding is performed while maintaining swing width of the welding torch, i.e., weaving width constant although the interspaces are ununiform as described above, excessive/insufficient welding is caused depending on portions and weld quality is extremely reduced.

In order to solve this problem, there have generally been proposed weld line profile control methods (for example, Japanese Patent Laid-Open Gazette No. 254979/1987 etc.) which can regularly perform good welding by automatically responding to changes of interspaces in weaving welding.

According to these proposed examples, welding voltages and welding currents are simultaneously measured while performing weaving welding, to detect weaving endpoints on the basis of changes of the welding voltages and the like. Assuming that an arc of a welding torch is controlled to maintain a constant welding voltage, for example, a current flowing in the welding torch during welding, i.e., a welding current, is reduced as the space between the leading edge portion of the welding torch and a groove face is widened, while being increased as the space therebetween is narrowed to the contrary. Therefore, a position where the current is abruptly changed is evaluated while continuously measuring the welding current, to judge the position as a weaving endpoint.

In the above proposed example, however, there is such a problem that it is impossible to satisfactorily perform welding (hereinafter referred to as "welding height constant control") in which a constant welding height is regularly ensured with respect to changes in groove width, as hereafter described. This is for the following reason:

As is generally known, the amount of melting of a welding wire per unit time is proportional to the feed rate of the welding wire. Namely, if the feed rate of a welding wire is increased in the case of employing a power source of constant voltage characteristics such as normal consumable electrode type gas shield welding, the amount of melting of the welding wire per unit time is increased in order to maintain a constant arc voltage, and the welding current is increased as the result. If the feed rate of the welding wire is reduced to the contrary, the amount of melting of the welding wire per unit time is reduced in order to maintain a constant arc voltage, and the welding current is reduced as the result.

Therefore, two methods may be considered for welding height constant control. The first method is a method of changing the feed rate of the welding wire in response to the groove width while maintaining the travel speed of the torch constant. When welding height constant control is performed by this method, the welding current is significantly changed following changes of the feed rate of the welding wire, to easily cause a defect such as lack of joint penetration.

On the other hand, the second method is a method of changing the travel speed of the torch in response to the groove width while maintaining the feed rate of the welding wire constant (manufacturing an amount of melting per unit time constant). In order to carry out the second method, at least the position of a next weaving endpoint with respect to the current position of the welding torch must be already known, in relation to performance of speed control. In the above proposed example, however, the next weaving endpoint is detected while performing weaving operation, and hence it is impossible to perform welding height constant control by the second method.

Although it is not mentioned in the above description, weaving welding must be executed while maintaining a space (hereinafter referred to as "torch height") between the welding torch and the groove bottom surface constant in the aforementioned welding height constant control. Therefore, it is also necessary to control the torch height to be constant during weaving welding.

DISCLOSURE OF THE INVENTION

A first object of the present invention is to solve the aforementioned problems of the prior art and provide a weld line profile control method which can accurately perform neither too much nor too little weaving welding even if an interspace between welded bodies is ununiform along the direction of a weld line.

Further, a second object of the present invention is to provide a weld line profile control method which can excellently perform welding height constant control while constantly maintaining the feed rate for a welding wire upon attaining the aforementioned first object.

Further, a third object of the present invention is to provide a weld line profile control method which can further accurately and constantly maintain a torch height upon attaining the aforementioned first object.

In addition, a fourth object of the present invention is to provide a weld line profile control method which can attain the aforementioned third object with a simple control algorithm.

The invention defined is a weld line profile control method of weaving welding bodies to be welded along a weld line on the basis of teaching data, and in order to attain the aforementioned first and second objects, it includes: (a) a step of evaluating a welding current and/or a welding voltage in a position close to a weaving endpoint as a reference value; and (b) a step formed by the following steps (b-1) to (b-2); (b-1) a step of actually measuring a welding current and/or a welding voltage in the vicinity of an n-th (n≧2) weaving endpoint respectively, (b-2) a step of correcting a weaving width from a (n−1)-th weaving endpoint to the n-th weaving endpoint on the basis of difference between the actually measured value and the reference value, (b-3) a step of evaluating a (n+1)-th weaving endpoint position on the basis of the corrected weaving width, and (b-4) a step of performing weaving welding from the n-th weaving endpoint to the (n+1)-th weaving endpoint on the basis of the positional data.

According to this invention, the position of a next weaving endpoint, i.e., the (n+1)-th weaving endpoint can be evaluated at the n-th weaving endpoint. Thus, even if an interspace between welded bodies is ununiform along the weld line direction, neither too much nor too little weaving welding can be performed, whereby welding accuracy of high quality can be ensured. Further, since welding from the n-th weaving endpoint to the (n+1)-th weaving endpoint is performed on the basis of the positional data of the (n+1)-th weaving endpoint, welding speed control is easy and welding height constant control can be excellently performed while constantly maintaining the feed rate for a welding wire.

In order to attain the aforementioned third and fourth objects, the invention defined further includes a step of evaluating the distance between a welding torch and the welded body and correcting the teaching data on the basis of difference between the distance and the distance between the welding torch and a reference body in teaching.

According to this invention, weaving welding is executed on the welded body on the basis of the teaching data corrected in advance of the weaving welding, whereby the torch height is maintained constant. Further, there is no need to adjust the distance between the welding torch and the welded body during weaving welding of the welded body, and a control algorithm for the weaving welding can be simplified.

Further, a further embodiment of the invention includes a weld line profile control method of swinging a welding torch in a substantially orthogonal direction with respect to a weld line on the basis of teaching data supplied in advance of welding for weaving-welding bodies to be welded along the weld line, which includes (a) a step formed by the following steps (a-1) to (a-4); (a-1) a step of performing welding from a welding start point to an n-th (n≧2) weaving endpoint on the basis of the teaching data, (a-2) a step of evaluating an average value of welding currents and/or welding voltages in the vicinity of substantially intermediate portions between mutually continuous weaving endpoints as a first reference value; (a-3) a step of evaluating an average value of welding currents and/or welding voltages in the vicinity of odd weaving endpoints and further evaluating difference between the average value and the first reference value as a second reference value, and (a-4) a step of evaluating an average value of welding currents and/or welding voltages in the vicinity of even weaving endpoints and further evaluating difference between the average value and the first reference value as a third reference value, (b) a step of actually measuring a welding current and/or a welding voltage in the vicinity of a substantially intermediate portion between an i-th (i n) weaving endpoint and an (i+1)-th weaving endpoint as a first actually measured value, and actually measuring a welding current and/or a welding voltage in the vicinity of the (i+1)-th weaving endpoint as a second actually measured value; (c) a step of evaluating an amount of difference between the first and second actually measured values and thereafter correcting positional data of an (i+3)-th weaving endpoint on the basis of difference between the amount of difference and the second reference value when the value (i+1) is an odd number while correcting the positional data of the (i+3)-th weaving endpoint on the basis of the difference between the amount of difference and the third reference value when the same is an even number; and (d) a step of performing weaving welding from the (i+2)-th weaving endpoint to the (i+3)-th weaving endpoint on the basis of the corrected positional data.

According to this invention, the average value of the welding current and/or the welding voltage, being the first reference value, is not influenced by the configuration of the welded body, but accurate adjustment of the weaving width can be performed on the basis of this average value. Consequently, neither too much nor too little weaving welding can be performed even if the interspace between the welded bodies is ununiform along the weld line direction, whereby welding accuracy of high quality can be ensured. Further, the position of the (n+3)-th weaving endpoint can be evaluated at the (n+1)-th weaving endpoint. Since weaving welding from the (i+2)-th weaving endpoint to the (i+3)-th weaving endpoint is performed on the basis of the positional data, welding rate control is easy and welding height constant control can be excellently performed while constantly maintaining the feed rate for the welding wire.

In order to attain the aforementioned third and fourth objects, the invention further inlcudes a step of evaluating the distance between the welding torch and the welded body in advance of weaving welding, and correcting the teaching data on the basis of difference between the distance and the distance between the welding torch and a reference welded body in teaching.

According to this invention, the torch height is constantly maintained for a reason similar to that of the aforementioned invention of the described first embodiment while it is possible to simplify a control algorithm for weaving welding.

In order to attain the aforementioned third object, the invention further includes a step of coinciding the space between the welding torch and the welded body with the teaching data on the basis of difference between the first actually measured value and the first reference value in advance of welding from a j-th (j n) weaving endpoint to a (j+1)-th weaving endpoint.

Therefore, the height of the welding torch is adjusted during weaving welding, so that the torch height can be made constant.

The above objects and other objects and effects of the present invention will become more clear from the following description made with reference to the accompanying drawings.

BRIEF DESCRIPTION OF THE DRAWINGS

FIG. 3 is a step diagram of a program employed in the first embodiment.

FIG. 13 is a step diagram of a program employed in the second embodiment.

BEST MODES OF CARRYING OUT THE INVENTION

A. Structure of Welding Robot

Figure 1:
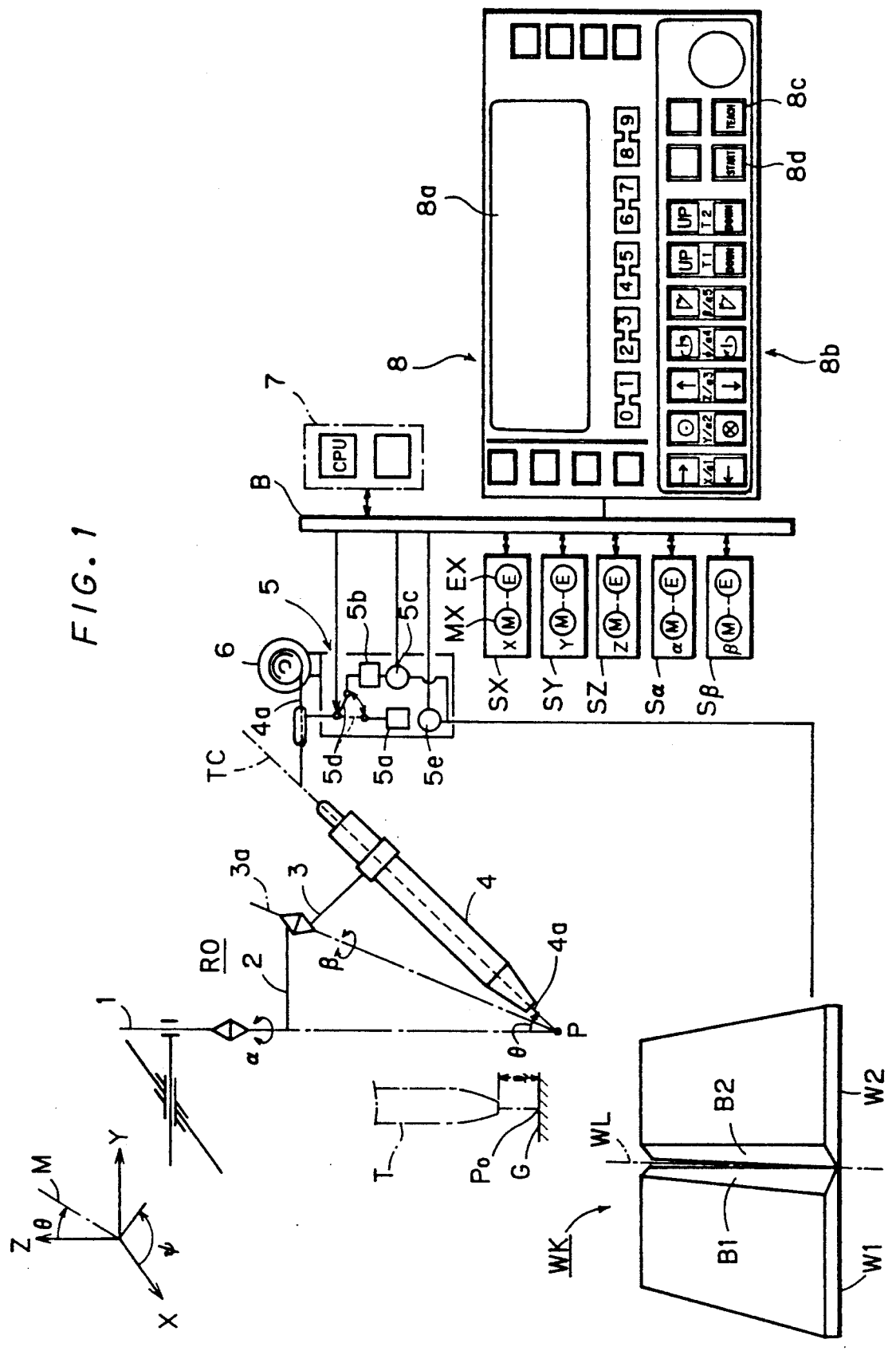
FIG. 1 is a diagram showing an example of a welding robot to which a weld line profile control method according to the present invention is applicable.

FIG. 1 is a general schematic diagram of a (X, Y, Z) rectangular coordinate system welding robot RO, to which first and second embodiments of the inventive weld line profile control method can be applied.

A vertical shaft 1 which is structured at an end of this welding robot RO (not shown in detail) supports a first arm 2 to be swingable about the shaft 1 (direction of arrow $\alpha$). A second arm 3, which is supported to be swingable about an inclined shaft 3a (direction of arrow $\beta$), is provided on the leading edge portion of this first arm 2. A welding torch 4 (an MIG welding torch in this embodiment) serving as an end effector is mounted on the leading edge portion of this second arm 3.

The central axes of the shaft 1, the shaft 3a and the torch 4 are so structured as to intersect at one point P. Further, the torch 4 is so set that its welding working point can match with the point P. In such a structure, an attitude angle $\theta$ of the torch 4 with respect to the vertical shaft 1 and a swinging angle $\psi$ (the so-called Euler's angle) can be controlled while fixing the point P by controlling angles of rotation to the directions of the arrows $\alpha$ and $\beta$.

A unit 5 is a welding source unit. This unit 5 comprises a spool 6 which takes up a consumable electrode (welding wire) 4a of the torch 4, and is structured to be capable of delivering the electrode 4a by rotating a feed roller although the detail is not shown, and can connect a welding source 5a between the electrode 4a and a workpiece WK. An energized state detector (current sensor) 5e is connected in series with the welding source 5a. The unit 5 further comprises a detector source 5b. This detector source 5b is prepared from that of a voltage of about 100 to 2000 V, whose current is limited to a small current, for example. Another energized state detector (current sensor) 5c is connected in series with the detector source 5b, while these and the power source 5a and the current sensor 5e are switchable by switching means 5d.

A well-known computer 7 serving as a control unit for the overall embodiment includes a CPU and a memory, while the current sensors 5c and 5e and the switching means 5d are connected to a bus line B of this computer 7.

A servo system SX for the X-axis of the robot RO is further connected to the bus line B, and this servo system SX includes motive power MX for the X-axis, as well as an encoder EX which outputs positional information thereof. Similarly, a servo system SY for the y-axis, a servo system SZ for the Z-axis, a servo system S$\alpha$ for the $\alpha$-axis and a servo system S$\beta$ for the $\beta$-axis, which are similarly structured, are connected to the bus line B.

Further, a remote control panel 8 is connected to the bus line B. This control panel 8 is structured to comprise, in addition to numerical input keys of "0" to "9", a key group for inputting previously allocated various data as well as a display 8a for serially displaying required messages and information responsive to key manipulation so that teaching operation can be performed in an interactive type.

A prescribed procedure for teaching as described later is previously programmed in the memory of the computer 7, and the computer 7 controls the display 8a on the basis of this program and key manipulation by an operator. Soft label selection keys are employed so that addition and deletion of functions can be easily performed without changing the key number, while these soft label selection keys are commonly used with the numerical input keys of "0" to "9". As to for which function the keys are used, the computer 7 is structured to judge and decide the same in accordance with the aforementioned previously programmed prescribed procedure and clearly show to the operator on the display 8a. Namely, for example, when the aforementioned prescribed procedure comes to a soft label selection procedure and a soft key label is displayed on the display 8a, the keys can be used as the soft label selection keys, while the same can be used as the numerical input keys if not a soft key label but a cursor blinks, for example, on the display 8a.

Data taught by the operator are stored in the memory of the computer 7 as a user program, and in execution of welding, the computer 7 controls the welding robot in accordance with this user program.

Figure 2:
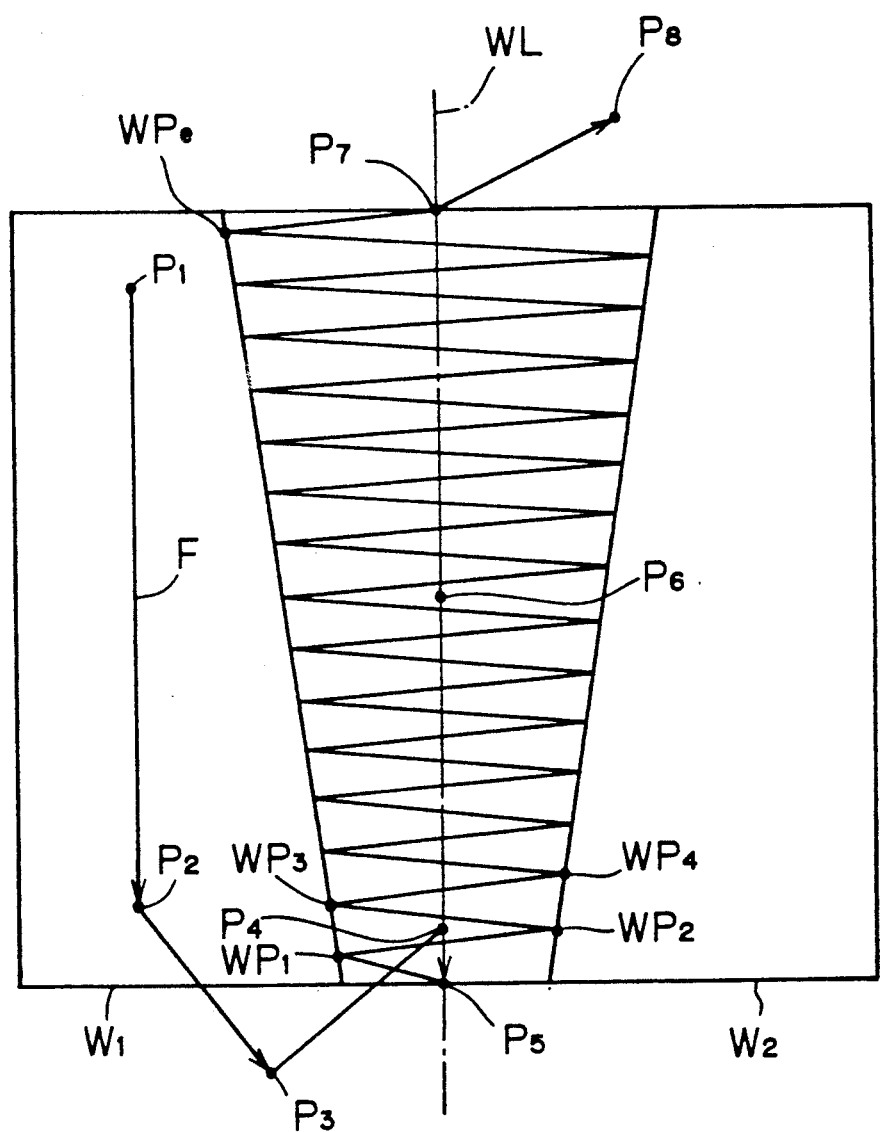
FIG. 2 is a diagram showing the manner of setting teaching points and the locus of a torch in a first embodiment of the present invention.

On the other hand, the workpiece WK in the first and second embodiments is formed by providing bevels B1 and B2 on respective ones of two horizontal plates W1 and W2 serving as first and second welded bodies as shown in FIG. 1, and it is considered that the horizontal plates W1 and W2 are butted and welded. As shown in FIGS. 1 and 2, however, it is assumed that the butt space is made ununiform by some cause, to slightly open toward an upper portion (remote portion) although the plates are in contact with each other at the lower end in the figure. FIG. 2 shows a state of viewing the bevel portion of the workpiece WK of FIG. 1 from above.

B. First Embodiment

Processing in the first embodiment according to the present invention will now be described around a portion related to the feature of this first embodiment.

(B-1) Teaching

For a start, the first processing is teaching, which will be described with reference to FIG. 2 showing positional relation of teaching points etc. and FIG. 3 showing steps of the program, in addition to the aforementioned FIG. 1.

The teaching processing is promoted by the operator manipulating the numerical input keys etc. of the control panel 8 in accordance with a message displayed on the display 8a, as hereinafter described.

(1) First, when power is supplied to this apparatus, an initial message, graphic display of which is omitted, is displayed on the display 8a in accordance with the program previously stored in the memory of the computer 7. Then, the operator viewing this message manipulates the numerical input keys of "0" to "9" and selects a manual mode M from three types of modes (the manual mode M, a test mode TE and an auto mode A). In correspondence to this, a message aiming at facilitating setting of travel speeds $V_m$ and $V_0$ of the torch 4 in the manual mode and the auto mode and a message as to which one of linear interpolation "L" and circular interpolation "C" is selected are respectively displayed on the display 8a. The operator manipulates the numerical input keys of "0" to "9" in accordance with these messages, to make the travel speed $V_m$ stored in the memory of the computer 7 as well as to set the travel speed $V_0$ and linear interpolation "L" respectively. Thereafter he manipulates a key group (hereinafter referred to as "operate key group 8b") corresponding to operation of each part of the welding robot RO, to move an electrode output end of the torch 4 to a position of dimensions of l ($P_0$ position of the dashed-and-dotted line in FIG. 1) with respect to a surface G of a certain determined conductor. Then he manipulates a "teach" key 8c, so that the computer 7 incorporates positional data ($X_0$, $Y_0$, $Z_0$, $\alpha_0$ and $\beta_0$) of the point $P_0$ and respective data of linear interpolation "L" and the speed $V_0$ as the contents of the first step of the program. As to movement of the torch 4 to the point $P_0$, positional data of the point $P_0$ may be previously stored in the computer 7, to call the same and automatically make position control.

(2) In accordance with messages being subsequently displayed on the display 8a, the operator manipulates the numerical input keys of "0" to "9" to set a sensing command "S", and further selects "99" as a sensor menu number SEM No. Then, he manipulates the "teach" key 8c, so that the positional data of the point $P_0$, sensing "S" and the SEM No. "99" are incorporated as data related to a step No. 2.

At the same time, the computer 7 outputs a command by the SEM No. "99", to switch the switching means 5d (solid line shown in the figure) and deliver an electrode 4a. When the leading edge of the delivered electrode 4a electrically comes into contact with the surface G, the circuit is closed and a detection signal is outputted from the sensor 5c, and the computer 7 stops delivery of the electrode 4a in repsonse to this (this processing is called "extension alignment"). In this state, a welding working point with respect to the torch 4 becomes the leading edge position of its electrode 4a. The switching means 5d is returned back.

(3) Then he manipulates the operate key group 8b, to move the torch 4 to an appropriate position (point $P_1$ in FIG. 2, for example). Then he clears the menu number SEM No. "99", and manipulates the numerical input keys of "0" to "9" to set linear interpolation "L". Then he manipulates the "teach" key 8c, so that positional data of the point $P_1$, linear interpolation "L" and the speed $V_0$ are incorporated as data related to a step No. 3

(4) In accordance with messages being subsequently displayed on the display 8a, the operator manipulates the numerical input keys of "0" to "9", to set a sensing command "S", and further sets "90" as a sensor menu number SEM No. Then he manipulates the "teach" key 8c, so that the computer 7 incorporates the information of sensing by the SEM No. "90" as data related to a step No. 4. Here, the SEM No. "90" means that sensing in the height direction is executed. This sensing in the height direction will be described later.

(5) Then he manipulates the operate key group 8b, to appropriately move the torch 4 to a point $P_2$ in FIG. 2 substantially in parallel with a weld line WL, for example. Then he clears the menu number SEM No. "90", and sets linear interpolation "L" by manipulating the numerical input keys of "0" to "9". Then he manipulates the "teach" key 8c, so that the positional data of the point $P_2$, linear interpolation "L" and the speed $V_0$ are incorporated as data related to a step No. 5.

(6) In accordance with messages being subsequently displayed on the display 8a, the operator manipulates the numerical input keys of "0" to "9", to set a sensing command "S", and further sets "90" as a sensor menu number SEM No. Then he manipulates the "teach" key 8c, so that the computer 7 incorporates information of sensing by the SEM No. "90" as data related to a step No. 6. This sensing in the height direction will also be described later similarly to the sensing related to the step No. 4.

(7) He manipulates the operate key group 8b, to locate the torch 4 at an arbitrary point $P_3$ which is close to a welding start point $P_5$. Then he clears the menu number SEM No. "90", and sets linear interpolation "L" by manipulation of the numerical input keys of "0" to "9". Then he manipulates the "teach" key 8c, so that computer 7 incorporates positional data of the point $P_3$ and the information of linear interpolation "L" as data related to a step No. 7.

(8) He manipulates the operate key group 8b, to move the torch 4 to a sensing start point $P_4$ which is close to the welding start point $P_5$. Then he manipulates the numerical input keys of "0" to "9" to set linear interpolation "L". Then he manipulates the "teach" key 8c, so that positional data of the point $P_4$, linear interpolation "L", and the speed $V_0$ are incorporated as data related to a step No. 8.

(9) In accordance with messages being subsequently displayed on the display 8a, the operator manipulates the numerical input keys of "0" to "9" to set a sensing command "S", and further sets "01" as a sensor menu number SEM No. Then he manipulates the "teach" key 8c, so that the computer 7 incorporates information of sensing by the SEM No. "01" as data related to a step No. 9. Here, the sensing command "S" and the SEM No. "01" are so set as to mean that it has been taught that sensing in the cross direction is executed. This sensing will be described later.

(10) Then he locates the torch 4 at the welding start point $P_5$ in an attitude suitable for welding, by manipulation of the operate key group 8b. Then, he selects arc sensing "AS", the SEM No. "01", a welding condition "01" and a correction system "98" by the numerical input keys of "0" to "9". Within these, "01" indicating the welding condition is assumed to be a number which is set in correspondence to a condition suitable for weaving. Further, arc sensing "$A_S$" and the correction system "98" are so set as to mean that it has been taught that welding thereafter is performed in a mode of amplitude variable weaving, which will be described in detail later. It results in that data related to a step No. 10 have been inputted by these manipulations.

(11) He locates the torch 4 at an arbitrary intermediate point $P_6$ (called a dummy point) by manipulation of the operate key group $8b$. Then he sets arc sensing "$A_S$", the SEM No. "01", an F No. "7" and a correction system "02" by the numerical input keys of "0" to "9". Within these, the F No. "7" is designation of the dummy point, and the correction system "02" is designation of a downward fillet as a welded joint configuration. Then he manipulates the "teach" key $8c$, so that the computer 7 incorporates positional data of the dummy point $P_6$, arc sensing "$A_S$", the SEM No. "01", the F No. "7" and the correction system "02" as data related to a step No. 11.

(12) He locates the torch 4 at a welding termination point $P_7$ in an attitude suitable for welding by manipulation of the operate key group $8b$. Then, he selects arc sensing "$A_S$" and a correction system "98" by the numerical input keys of "0" to "9". Within these, meaning of setting of the arc sensing "$A_S$" and the correction system "98" is as described above. Then, he manipulates the "teach" key $8c$, so that the computer 7 incorporates positional data of the welding termination point $P_7$, arc sensing "$A_S$", and the correction system "98" as data related to a step No. 12.

(13) Finally he locates the torch 4 at an arbitrary retractive point $P_8$ to which the same can be linearly shifted from the welding termination point $P_7$. Then he manipulates the "teach" key $8c$ upon setting linear interpolation "L" by the numerical input keys of "0" to "9", so that positional data of the point $P_8$ and linear interpolation "L" are incorporated as data related to a step No. 13.

Teaching is thus terminated. Then the operator manipulates the numerical input keys of "0" to "9" to switch from the manual mode M to the test mode TE and manipulates a "start" key $8d$, whereby the welding robot RO executes operation similar to operation in welding as described later without performing welding. The operator monitors the operation, to perform correction if there is an error in data in teaching etc. Thus, teaching and correction of the data are completed, and preparation for welding is completed.

(B-2) Playback

Then, when welding is performed in practice, the operator manipulates the operate key group $8b$ to newly locate the torch 4, and thereafter manipulates the numerical input keys of "0" to "9" to switch from the test mode TE to the auto mode A, and manipulates the "start" key $8d$. In response to this, various command signals are outputted from the computer 7, so that welding by the body of the welding robot RO is executed. In advance of description of actual weaving welding operation, processing executed by the computer 7 and the operation of the body of the welding robot RO based on command output from the computer 7 are now described with reference to a flow chart of FIG. 4.

The computer 7 first judges whether or not the corresponding step (corresponding step in FIG. 3) is sensing "S" at a process 101, and advances the processing to a process 102 in the case of YES while advances the processing to a process 103 in the case of NO. It judges whether or not the corresponding step is arc sensing "$A_S$" at the process 103, and advances the processing to a process 104 in the case of YES and to a process 105 in the case of NO. Processing other than sensing "S" and arc sensing "$A_S$" is executed at the process 105, while movement of the torch by linear interpolation "L" (steps Nos. 1, 3, 5, 7, 8 and 13) is executed here in accordance with the content of programming (teaching) in FIG. 3. On the other hand, a determination is made at the process 104 as to whether or not a correction system AUX No. is "98", and advancement is made to a process 109 when the determination at the process 104 is YES and to a process 110 in the case of NO. Normal arc sensing is executed at the process 110. On the other hand, variable amplitude weaving as described later is executed at the process 109.

At the process 102, a judgement is made as to what number a sensor menu number SEM No. is. Advancement is made to the process 106 when the SEM No. is judged to be "99" to the process 107 when the SEM No. is judged to be "90," and to the process 108 when the SEM No. is judged to be a number other than those. Extension alignment is executed at the process 106, so that the electrode $4a$ projection length of the torch 4 is defined at prescribed length l. Sensing in the height direction as described later in detail is executed at the process 107.

Sensing in the cross direction is executed at the process 108. Namely, the switching means $5d$ is first switched toward the current sensor $5c$, and then sensing utilizing electrical contact between the leading edge of the electrode $4a$ of the torch 4 and the workpiece WK is executed. For example, the torch 4 is swung in the horizontal direction (left-right direction in FIG. 2) from the sensing start point $P_4$, so that positional data of a contact point (referred to as $SP_1$) with the left horizontal plate W1 and a contact point (referred to as $SP_2$) with the right horizontal plate W2 are incorporated. Then the computer 7 calculates the interdistance $D_{12}$ between the both horizontal plates W1 and W2 and positional data of an intermediate point $P_4'$ between these on the basis of the aforementioned incorporated positional data of $SP_1$ and $SP_2$, to evaluate difference $\Delta P_4$ from the positional data of the point $P_4$ and difference $\Delta D_4$ from amplitude data included in the welding condition "01." The sensing position information $\Delta P_4$ and the sensing amplitude information $\Delta D_{12}$ are stored as data related to the SEM No. 01 respectively. In a process following the process 108, teaching data are corrected by the sensing position information $\Delta P_4$ and the sensing amplitude information $\Delta D_{12}$ thus obtained. Namely, positional data of designated points $P_5$ and $P_6$ of the SEM No. 01 are corrected by the aforementioned sensing position information $\Delta P_4$, while amplitude information of the first cycle of weaving is corrected by the sensing amplitude information $\Delta D_{12}$. This sensing correction is particularly effective for correction of individual difference between welded bodies, individual fixing errors and the like.

When the aforementioned process 105, 106, 107, 108, 109 or 110 is completed, a determination is made at a process 111 as to whether or not the corresponding step is the final step. The series of processes are terminated if it is the final step, while the step is updated at a process 112 if it is not the final step, to return to the process 101 and repeat the aforementioned processes.

Figure 4:
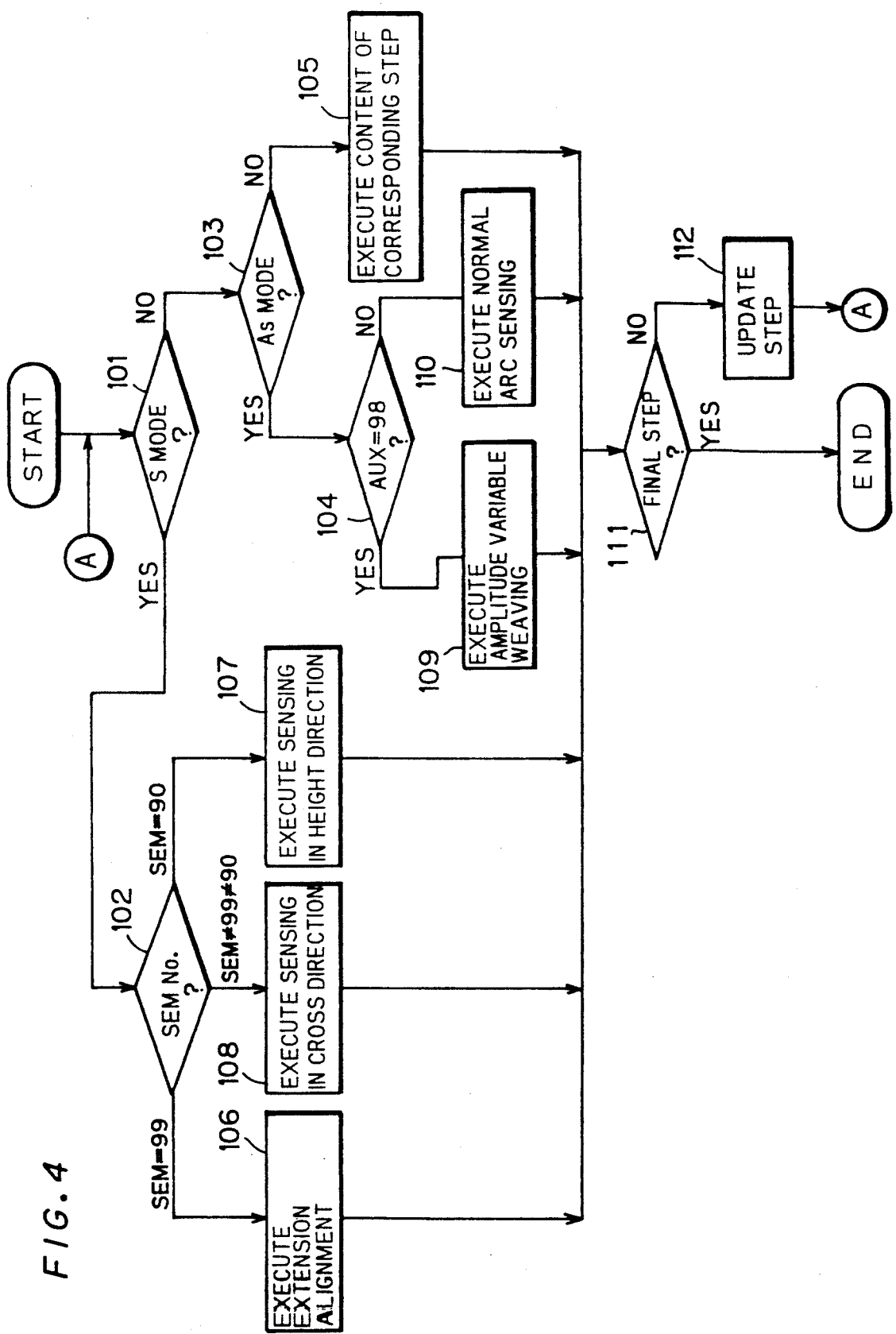
FIG. 4 is a flow chart showing the operation of the first embodiment.

Actual weaving welding operation performed in accordance with a flow chart of FIG. 4 on the basis of the teaching data of FIG. 3 will now be described in due order. When the step data of FIG. 3 are applied to the aforementioned processing flow, the forward end of the torch 4 follows a locus F (excluding sensing portion) in FIG. 2. Namely, the forward end of the torch 4 is first located at the point $P_0$ (FIG. 1) in response to the data of the step No. 1, so that the aforementioned extension alignment is executed there on the basis of the data of the step No. 2. Then the forward end of the torch 4 moves to the point $P_1$ by linear interpolation in response to the data of the step No. 3, so that sensing in the height direction as described later in detail is executed on the basis of the data of the step No. 4.

Then the forward end of the torch 4 moves to the point $P_2$ by linear interpolation in response to the data of the step No. 5, so that sensing in the height direction is executed in response to the data of the step No. 6. Then the forward end of the torch 4 moves to the retractive point $P_3$ on the basis of the data of the step No. 7, and thereafter moves to the point $P_4$ for executing sensing in the cross direction in response to the data of the step No. 8, so that the aforementioned sensing in the cross direction is executed there on the basis of the data of the step No. 9.

Then the forward end of the torch 4 moves to the point $P_5$ by linear interpolation, starts welding on the basis of the data of the steps No. 10 to No. 12, and performs weaving welding while varying its amplitude as hereinafter described following changes of the interspace between the horizontal plates W1 and W2 in the weld line direction. The point $P_6$ is designated as a dummy point by the F No. "7", and hence the torch 4 is advanced neglecting this point. Thus, the forward end of the torch 4 performs weaving welding while successively widening its amplitude in FIG. 2, and moves to the retractive point $P_8$ on the basis of the data of the step No. 13 when the same completes weaving welding at the point $P_7$, to terminate the series of welding processes.

(B-3) Sensing in Height Direction

Figure 5:
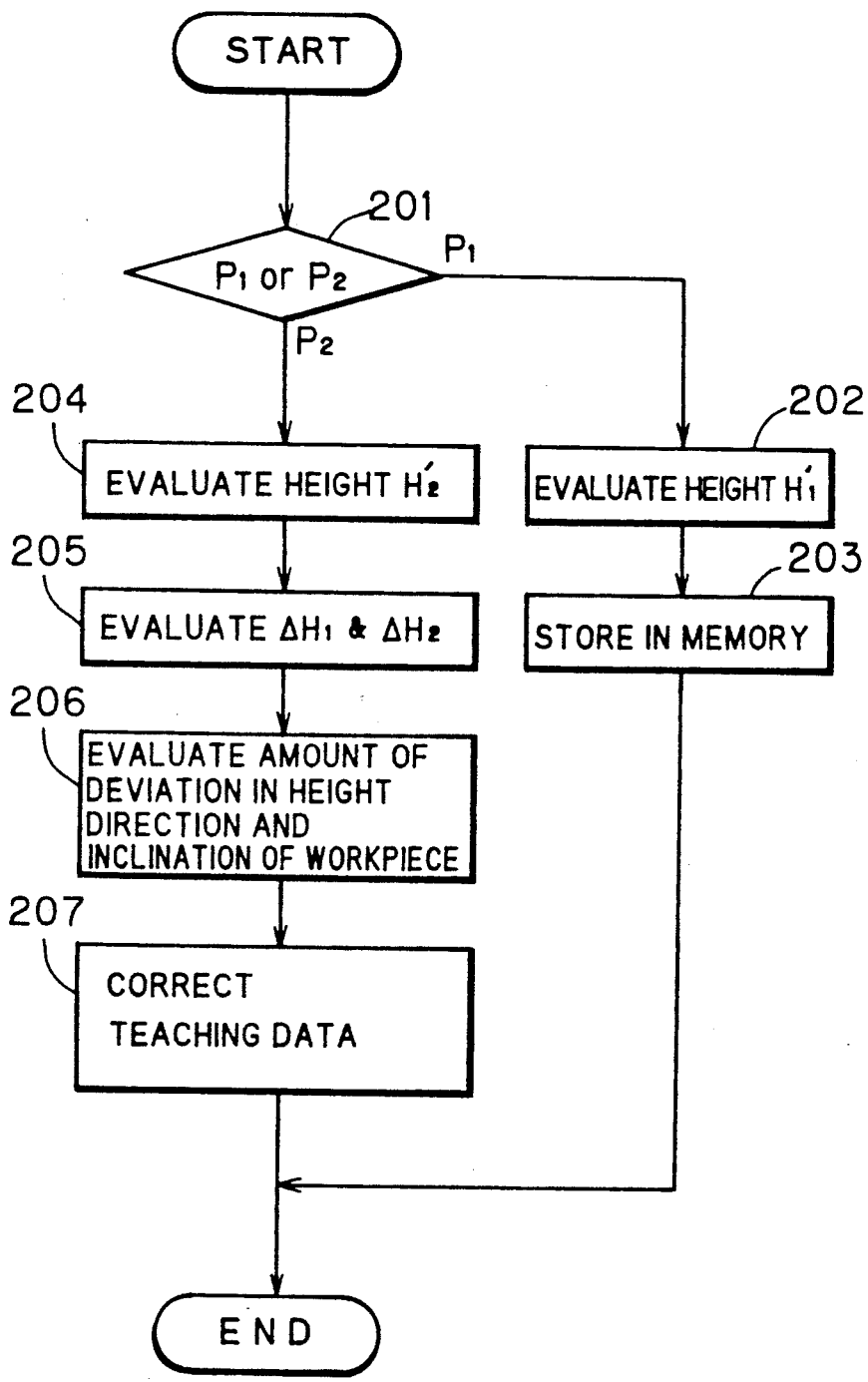
FIG. 5 is a flow chart showing an example of a sensing procedure in a height direction.

Then, sensing in the height direction performed in the above process 107 will be described in detail with reference to FIG. 5. FIG. 5 is a flow chart showing the procedure of the sensing in the height direction in this case. When the forward end of the torch 4 is moved to the point $P_1$ or the point $P_2$, the computer 7 executes the processes 201 to 207 in accordance with the prescribed program stored in the memory. First, at the process 201, it judges whether the forward end of the torch 4 is moved to the point $P_1$ or moved to the point $P_2$. If it is judged that the torch 4 is moved to the point $P_1$ as shown by the solid line in FIG. 6, the switching means 5d is switched (solid line in FIG. 1) in response to a command from the computer 7, so that the electrode 4a is delivered. When the forward end of the delivered electrode 4a electrically comes into contact with the horizontal plate W1, the circuit is closed and a detection signal is outputted from the sensor 5c. The computer 7 receives this to stop delivery of the electrode 4a while evaluating the space between the point $P_1$ and the horizontal plate W1, i.e., height information (distance between the torch forward end and the horizontal plate W1) of the horizontal plate W1 in a position corresponding to the point $P_1$ from the amount of delivery of the electrode 4a (process 202), and stores the same in the memory (process 203).

Figure 6:
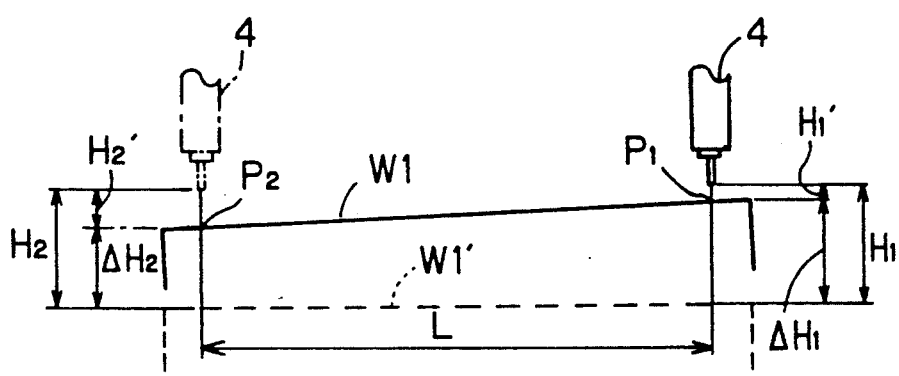
FIG. 6 is an explanatory diagram for illustrating the above sensing procedure in the height direction.

If it is judged that the torch 4 is moved to the point $P_2$ as shown by the dashed-and-dotted line in FIG. 6, on the other hand, a prescribed command is outputted from the computer 7, to evaluate height information (distance between the torch forward end and the horizontal plate W1) $H_2'$ of the horizontal plate W1 in a position corresponding to the point $P_2$ (process 204), similarly to the above. Then, the positional data (distances between the torch forward end and the reference horizontal plate W1') $H_1$ and $H_2$ detected in teaching (broken line in FIG. 6) and the positional information $H_1'$ evaluated in the process 202 are read from the memory, to evaluate the amounts of deviation $\Delta H_1$ and $\Delta H_2$ in accordance with the following equations (process 205):

$$\Delta H_1 = H_1 - H_1'$$

$$\Delta H_2 = H_2 - H_2'$$

In the process 206, the amount of deviation of the horizontal plate in the height direction and inclination of the horizontal plate are geometrically evaluated on the basis of the amounts of deviation $\Delta H_1$ and $\Delta H_2$ and the distance $L_{12}$ (FIG. 6) between the points $P_1$ and $P_2$. In the process 207 following the process 206, the teaching data are corrected so that the torch height is constant ($=h$) in weaving welding by the sensing positional information (amount of deviation and inclination) in the height direction thus obtained.

As hereinabove described, the sensing in the height direction is performed in advance of actual welding to correct the teaching data, whereby the torch height is regularly maintained constant. Further, since there is no need to perform torch height control during weaving welding, the control algorithm is simplified as compared with the case of performing torch height control during weaving welding. Further, the sensing positional information in the height direction is obtained in the aforementioned manner, whereby substantially no influence is caused by noise or the like and the torch height can be accurately maintained constant.

The means for evaluating the height direction of the horizontal plate W1 is not restricted to the aforementioned one, but a pressure sensor, a magnetic sensor, a visual sensor and the like, for example, may be separately provided on the welding torch 4 to evaluate the information by these.

Although the height data of the horizontal plate W1 have been evaluated as to the two points $P_1$ and $P_2$ in the above embodiment, height data may be evaluated as to at least three points to correct teaching data from these data, as a matter of course.

Figure 7:
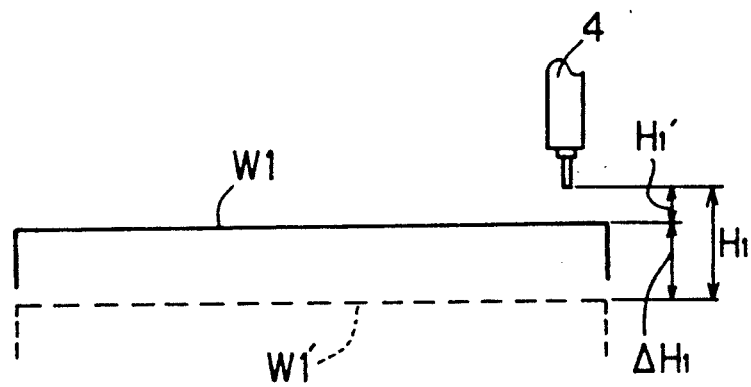
FIG. 7 is an explanatory diagram for illustrating another example of a sensing procedure in the height direction.

Further, if a horizontal plate is not inclined but merely deviates only in the height direction as shown in FIG. 7, height data of the horizontal plate W1 may be evaluated as to only a point $P_1$, for example, to correct teaching data on the basis of this information.

If it is compensated for that the amounts of deviation of horizontal plates W1 and W2 in the height direction are small, however, the aforementioned sensing in the height direction is not necessarily indispensable processing.

(B-4) Amplitude Variable Weaving

Figure 8A:
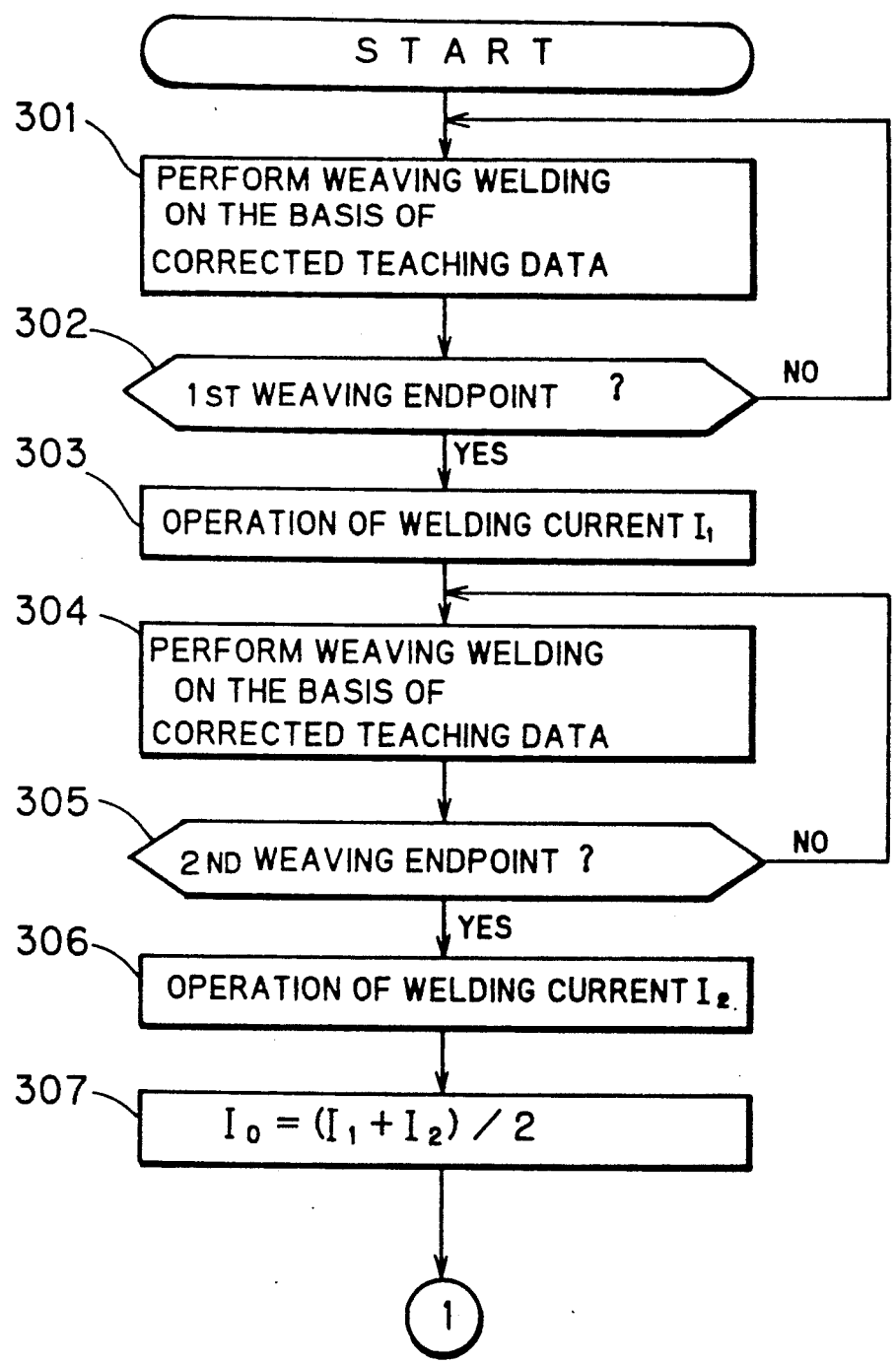
FIGS. 8A and 8B are flow charts of amplitude variable weaving according to the first embodiment.
Figure 8B:
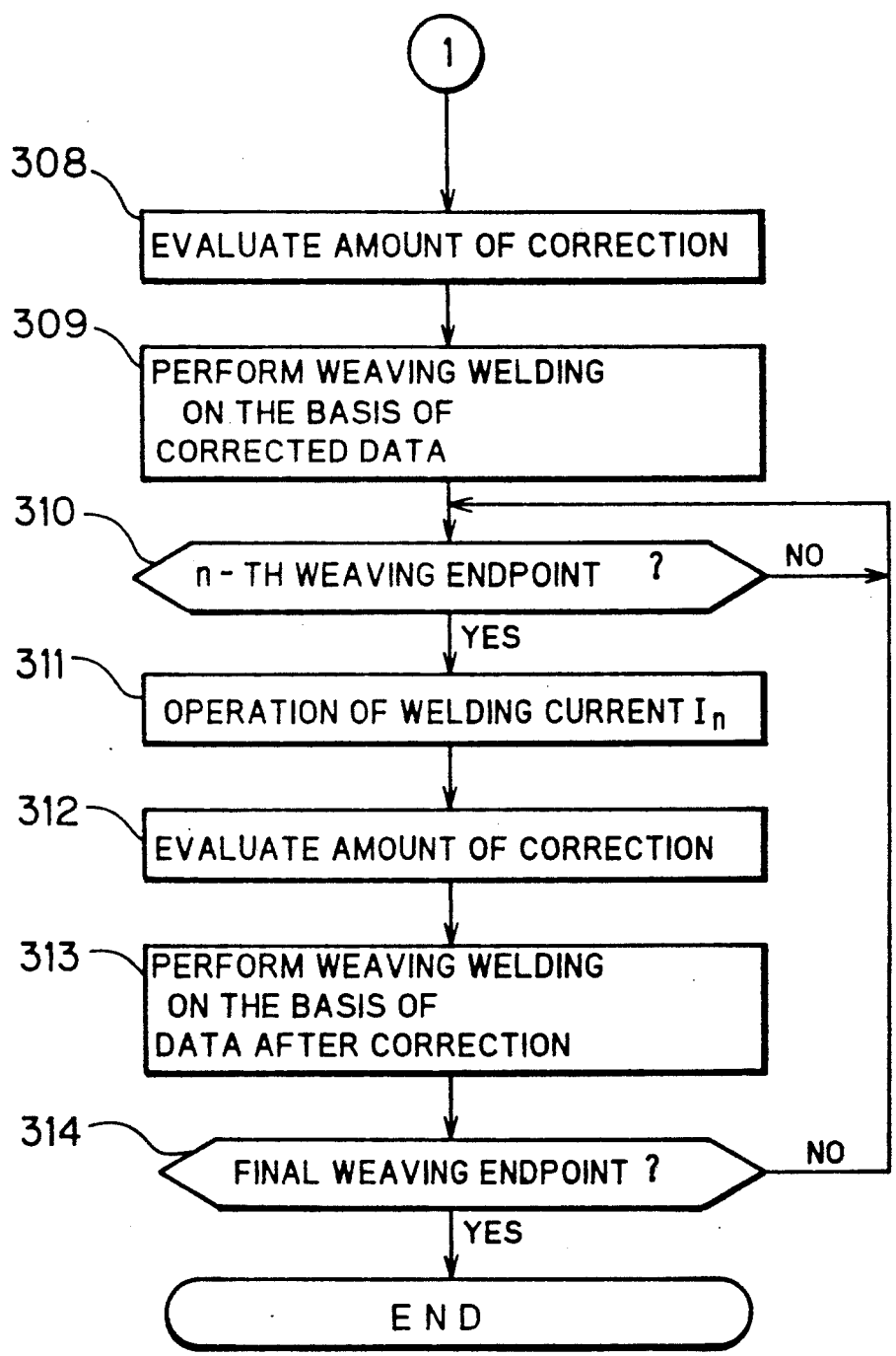

Amplitude variable weaving performed in the above process 109 will now be described in detail with reference to FIG. 8A and FIG. 8B. FIG. 8A and FIG. 8B are flow charts showing an amplitude variable method in this case. First, in response to a command from the computer 7, welding is executed from the welding start point P5 toward a first weaving endpoint WP1 (process 301). At this time, the weaving welding is performed on the basis of the teaching data corrected in the process 108. Then, when it is confirmed that the torch 4 has reached the first weaving endpoint WP1 (process 302), the computer 7 samples a welding current within a constant time in the vicinity of the first weaving endpoint WP1 measured by the current sensor 5e of FIG. 1 to evaluate an integrated welding current $I_1$ corresponding to its added value (process 303), and stores the current value $I_1$ in its memory. It is supposed here that the integrated value of the welding current is obtained so that, even if the value measured at the weaving endpoint WP1 includes an error such as noise, influence by the noise can be reduced by integrating the current value actually measured in the vicinity of the endpoint WP1.

Then, the progress direction of the torch 4 is changed to a reverse direction, and welding is executed from the first weaving endpoint WP1 toward a second weaving endpoint WP2 in response to a command from the computer 7 (process 304). Weaving welding at this time is performed on the basis of the corrected teaching data, similarly to the process 301. When it is confirmed that the torch 4 has reached the second weaving endpoint WP2 (process 305), the computer 7 integrates a welding current in the vicinity of the second weaving endpoint WP2 measured by the current sensor 5e to evaluate an integrated welding current $I_2$ (process 306), and stores the value $I_2$ in the memory. Since the welding has heretofore been performed on the basis of the data corrected in the process 108, positional relation between the torch 4 and the horizontal plates W1 and W2 at the first and second weaving endpoints WP1 and WP2 regularly becomes that shown in FIG. 9A, and good welding is obtained.

Then, the computer 7 reads the values of the integrated welding currents $I_1$ and $I_2$ from the memory, to evaluate a reference current $I_0$ in accordance with the following equation (process 307), and stores the same in the memory of the computer 7:

$$I_0 = (I_1 + I_2)/2 \tag{1}$$

Figure 9A:
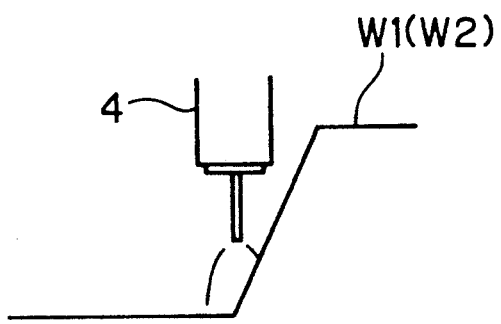
FIGS. 9A to 9C are explanatory diagrams of positional relations between torches and grooves faces in weaving endpoints, respectively.

Here, consider the meaning of the reference current $I_0$. As will be understood from the above description, the torch 4 and the welded bodies W1 and W2 are in good positional relation at the first and second weaving endpoints WP1 and WP2 as shown in FIG. 9A and the integrated welding currents at this time are the currents $I_1$ and $I_2$, and hence, assuming that an integrated welding current I in the vicinity of a certain weaving endpoint is the same value as the reference current $I_0$ which is the average value of the currents $I_1$ and $I_2$, it can be said that the torch 4 and the horizontal plates W1 and W2 at this time are in good relation (FIG. 9A). When the integrated welding current I is a value smaller than the reference current $I_0$, it is understood that the torch 4 is extremely separated from the horizontal plates W1 and W2 (FIG. 9B) from this ($I < I_0$). If it is a value larger than the reference current $I_0$ to the contrary, it is understood that the torch 4 is extremely close to the horizontal plates W1 and W2 (FIG. 9C) from this ($I > I_0$). Namely, positional relation between the torch 4 and the horizontal plates W1 and W2 can be reduced from large-small relation between an integrated value (integrated welding current I) of a welding current actually measured in the vicinity of a weaving endpoint and the reference current $I_0$.

Therefore, in the process 308, an amount of deviation (hereinafter referred to as "correction amount $\Delta$") at a weaving endpoint is evaluated from the following equation:

$$\text{correction amount } \Delta = |\Sigma k_i dI^i| \cdot S_{ig}(dI) \tag{2}$$

where $$S_{ig}(dI) = \begin{cases} -1 & (dI < 0) \\ 0 & (dI = 0) \\ 0 & (dI > 0) \end{cases}$$

$dI = (I_0 - I_n)$
$I_n$: actually measured welding current in the vicinity of an n-th weaving endpoint WP$_n$
n: natural number
$k_i$: constant Although the correction amount $\Delta$ has been approximated by the equation (2) in this embodiment, it is not restricted to this. Further, it has been verified from various experiments that sufficient accuracy can be obtained even if the correction amount $\Delta$ is evaluated by primary approximation of the equation (2) in place of the equation (2).

Figure 10:
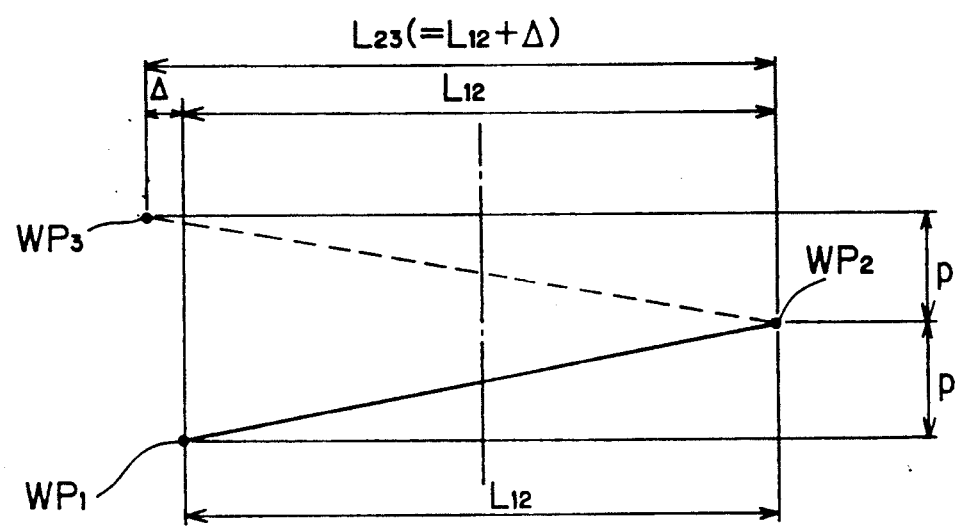
FIG. 10 is an explanatory diagram for illustrating a method of calculating the position of a next weaving endpoint with respect to the current position of a welding torch.

When the correction amount $\Delta$ is evaluated, the correction amount $\Delta$ is added to the weaving width in the process 304, so that the weaving width of subsequently performed welding (welding from the second weaving endpoint WP2 toward a third weaving endpoint WP3) is corrected. When, for example, welding (solid line in FIG. 10) from the first weaving endpoint WP1 to the second weaving endpoint WP2 is executed on the basis of weaving width $L_{12}$ and a pitch p as shown in FIG. 10 and the correction amount (positive value) is evaluated in the process 308, weaving width $L_{23}$ is evaluated in the computer 7 in accordance with the following equation:

$$L_{23} = L_{12} + \Delta$$

Further, the position of the third weaving endpoint WP3 is geometrically evaluated on the basis of the weaving width $L_{23}$ and the pitch p.

Then, welding (broken line in FIG. 10) from the second weaving endpoint WP2 to the third weaving endpoint WP3 is executed in accordance with the positional data (process 309).

Then, when it is confirmed that the torch 4 has reached the third weaving endpoint WP3 (process 310), a welding current in the vicinity of the third weaving endpoint WP3 measured by the current sensor 5e is integrated to evaluate an integrated welding current $I_3$ (process 311). Then, a correction amount $\Delta$ is evaluated similarly to the above process 308 (process 312), and the correction amount $\Delta$ is added to the weaving width in the process 309, so that weaving width of subsequently performed welding (welding form the third weaving endpoint WP₃ to a fourth weaving endpoint WP₄) is corrected. Then, the position of the next weaving endpoint WP₄ is evaluated on the basis of the width, and welding is executed toward the next weaving endpoint WP₄ (process 313).

The aforementioned processes 310 to 313 are executed until the torch 4 reaches a final weaving endpoint WP$_e$ (process 314). Welding from the final weaving endpoint WP$_e$ to the welding termination point P₇ is executed on the basis of the teaching data corrected in the process 108.

As described above, the position of a next weaving endpoint with respect to the current position of the welding torch 4 is regularly known (when the current position of the welding torch 4 is the second weaving endpoint WP₂, for example, the position of the third weaving endpoint WP₃ is evaluated in the aforementioned manner) in this first embodiment, whereby the weaving amplitude can be correctly changed following the change of the interspace between the horizontal plates W1 and W2 in the weld line direction. Thus, even if the interspace between the welded bodies is ununiform along the weld line direction, neither too much nor too little weaving welding can be performed.

For a similar reason, further, it is easy to appropriately control the travel speed (i.e., welding progress speed) of the welding torch 4 in welding from the current position to a next weaving endpoint. It is possible to exellently perform welding height constant control by controlling the welding progress speed while maintaining the feed rate of the welding wire constant (making the amount of welding of the consumable electrode (welding wire) 4a per unit time constant).

Further, since the welding currents in constant times in the vicinity of weaving endpoints are sampled to evaluate the integrated welding currents $I_1$, $I_2$, $I_3$, . . . corresponding to added values thereof for evaluating positional data of the weaving endpoints on the basis of these values, erroneous detection of weaving endpoints caused by noise or the like is prevented and correct welding can be performed. If there is no need to consider influence by disturbance such as noise, however, it is not necessarily required to use integrated ones as welding currents for evaluating the reference current I, but welding currents sampled at the weaving endpoints may directly be used.

Although the reference current $I_0$ has been evaluated on the basis of the integrated welding currents $I_1$ and $I_2$ (process 307) in the above embodiment, setting of the reference current $I_0$ is not restricted to this. For example, it is also possible to regard the integrated welding current $I_1$ as the reference current $I_0$. Further, although the reference current $I_0$ has been evaluated by simple averaging of the integrated welding currents $I_1$ and $I_2$, weighted mean or the like may be employed. Further, the integrated welding current $I_2$ may be set as the reference current $I_0$.

Further, it is also possible to independently provide reference currents on left and right ends of weaving, whereby the same is applicable to also applicable to a horizontally non-objective joint such as a single bevel groove, for example.

In the above embodiment, further, the welding from the welding start point P₅ to the second weaving endpoint WP₂ is performed on the basis of the teaching data corrected in the process 108, while the correction amount Δ is first evaluated in the welding from the second weaving endpoint WP₂ to the welding termination point P₇ (processes 308 and 312), to correct the next weaving width on the basis thereof, and welding is performed after the position of the next weaving endpoint is evaluated on the basis of the width. However, the present invention is not restricted to the aforementioned embodiment, but the welding from the welding start point P₅ to the first weaving endpoint WP₁ may be performed by the former (process 108) to regard the integrated welding current $I_1$ as the reference current $I_0$, while performing the welding from the first weaving endpoint WP₁ to the welding termination point P₇ by the latter. Further, welding from the welding start point P₅ to an m-th weaving endpoint WP$_m$ (where $m \geq 3$) may be performed by the former, while performing welding from the m-th weaving endpoint WP$_m$ to the welding termination point P₇ by the latter.

Figure 11:
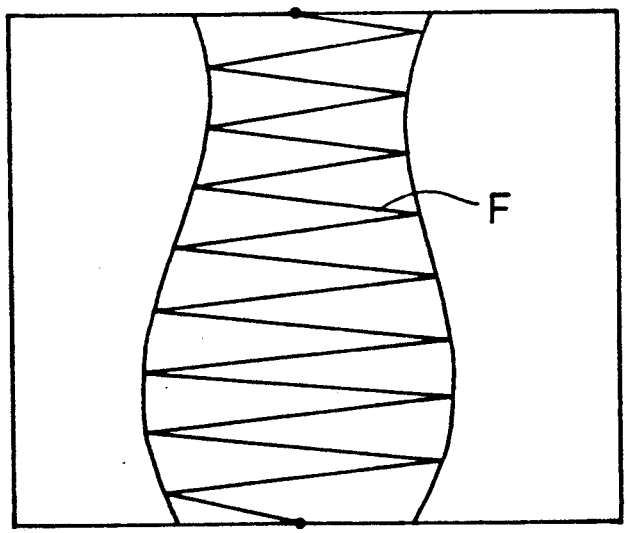
FIG. 11 is an explanatory diagram of a modification of first and second embodiments.

Further, although such change that the interspace is uniformly widened with forward advance has been considered in the above embodiment as shown in FIGS. 1 and 2, the present invention can also be applied to such workpieces that the interspace is ununiformly changed as shown in FIG. 11, for example. Further, it is also applicable to a workpiece other than the horizontal plate.

Although the correction amount Δ has been evaluated noting the welding current, the correction amount Δ may be evaluated on the basis of a welding voltage in place of the welding current, as a matter of course. Further, the welding current and the welding voltage may be simultaneously measured to evaluate the correction amount from the same.

C. Second Embodiment

Then, processing in a second embodiment of the present invention will be described around parts related to the feature of the second embodiment.

(C-1) Teaching

Figure 12:
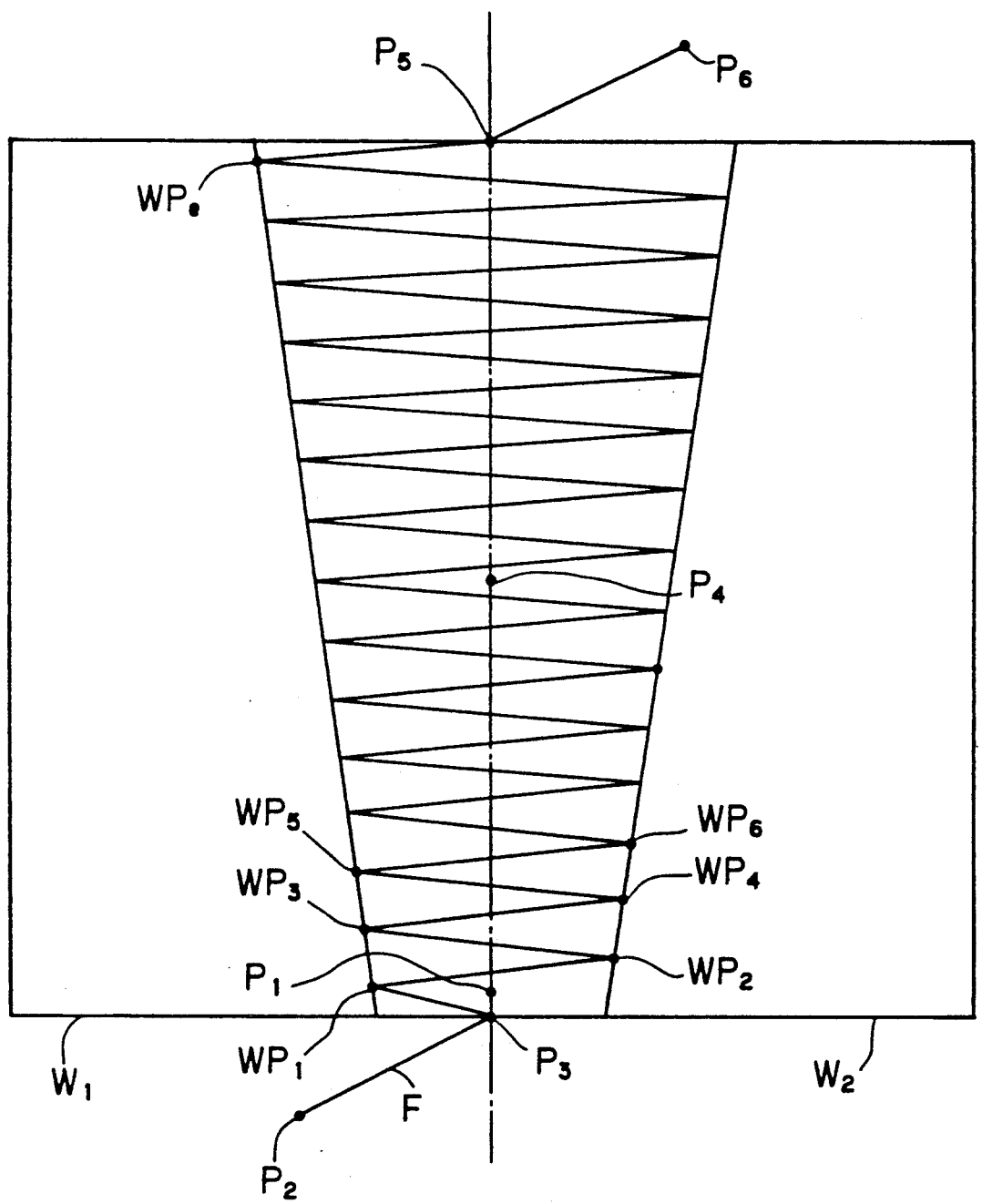
FIG. 12 is a diagram showing the manner of setting teaching points and the locus of a torch in the second embodiment of the present invention.

For a start, the first process is teaching, which will be described with reference to FIG. 12 showing positional relation of teaching points etc. and FIG. 13 showing steps of the program, in addition to the aforementioned FIG. 1.

The teaching processing is advanced by the operator manipulating the numerical input keys etc. of the operation panel 8 in accordance with messages displayed on the display 8a, similarly to the case of the first embodiment.

(1) First, when power is supplied to this apparatus, an initial message (not shown) is displayed on the display 8a, similarly to the first embodiment. Then, the operator selects a manual mode M, and thereafter sets a travel speed V$_m$, a travel speed V₀ and linear interpolation "L" respectively. In succession to this, the operator manipulates the operate key group 8b, to move the welding torch 4 to a point P₀. Then he manipulates the "teach" key 8c, so that the computer 7 incorporates respective data of positional data of the point P₀ (X₀, Y₀, Z₀, α₀ and β₀), linear interpolation "L" and the speeds V₀ and V$_m$ as the contents of the first step of the program. As to movement of the torch 4 to the point P₀, the positional data of the point P₀ may be previously stored in the computer 7, to call the same and automatically perform position control.

(2) Then, similarly to the first embodiment, the operator manipulates the numerical input keys of "0" to "9" to set a sensing command "S", and further selects "99" as a sensor menu number SEM No.. Then, he manipulates the "teach" key 8c, so that the positional data of the point $P_0$, sensing "S" and the SEM No. "99," are incorporated as data related to a step No. 2.

At the same time, the computer 7 outputs a command by the SEM No. "99," to execute extension alignment.

(3) Then he manipulates the operate key group 8b, to move the torch 4 to a first sensing start point $P_1$ which is close to a welding start point $P_3$. Then he clears the menu number SEM No. "99" and manipulates the numerical input keys of "0" to "9" to set linear interpolation "L." Then, he manipulates the "teach" key 8c, so that positional data of the point $P_1$, linear interpolation "L" and the speed $V_0$ are incorporated as information related to a step No. 3.

(4) In accordance with messages being subsequently displayed on the display 8a, the operator manipulates the numerical input keys of "0" to "9" to set a sensing command "S," and further sets "01" as the SEM No. Then, he manipulates the "teach" key 8c, so that the computer 7 incorporates information of sensing by SEM No. "01" (sensing in the cross direction) as data related to a step No. 4.

(5) He manipulates the operate key group 8b, to locate the torch 4 at an arbitrary point $P_2$ which is close to the welding start point $P_3$. Then he sets linear interpolation "L" by manipulation of the numerical input keys of "0" to "9." Then he manipulates the "teach" key 8c, so that the computer 7 incorporates positional data of the point $P_2$ and information of linear interpolation "L" as data related to a step No. 5.

(6) Then he locates the torch 4 at the welding start point $P_3$ in an attitude suitable for welding, by manipulation of the operate key group 8b. Then he selects arc sensing "$A_S$," a SEM No. "01," a welding condition "01" and a correction system "98" by the numerical input keys of "0" to "9." Then he manipualtes the "teach" key 8c, so that the computer 7 incorporates positional data of the point $P_3$, arc sensing "$A_S$," the SEM No. "01," the welding condition "01" and the correction system "98" as data related to a step No. 6.

(7) He locates the torch 4 at an arbitrary intermediate point $P_4$ (called a dummy point) by manipulation of the operate key group 8b. Then he sets arc sensing "$A_S$," the SEM No. "01," an F No. "7" and a correction system "02" by the numerical input keys of "0" to "9". Then he manipulates the "teach" key 8c, so that the computer 7 incorporates positional data of the dummy point $P_4$, arc sensing "$A_S$," the SEM No. "01," the F No. "7" and the correction system "02" as data related to a step No. 7.

(8) He locates the torch 4 at a welding termination point $P_5$ in an attitude suitable for welding by manipulation of the operate key group 8b. Then, he selects arc sensing "$A_S$" and a correction system "98" by the numerical input keys of "0" to "9." Then he manipulates the "teach" key 8c, so that the computer 7 incorporates positional data of the welding termination point $P_5$, arc sensing "$A_S$" and the correction system "98" as data related to a step No. 8.

(9) Finally he locates the torch 4 at an arbitrary retractive point $P_6$ to which the same can be linearly shifted from the welding termination point $P_5$ by manipulation of the operate key group 8b. Then he manipulates the "teach" key 8c upon setting linear interpolation "L" by the numerical input keys of "0" to "9," so that positional data of the point $P_6$ and linear interpolation "L" are incorporated as data related to a step No. 9.

Teaching is thus terminated. Then the operator manipulates the numerical input keys of "0" to "9" to switch from the manual mode M to a test mode TE and manipulates a "start" key 8d, so that the welding robot RO executes operation similar to operation in welding as described later, without performing welding. The operator monitors the operation and performs correction if there is an arror in the data in teaching or the like.

(C-2) Playback

As described above, teaching and correction of the data thereof are completed and preparation for welding is completed. In the case of actually performing welding, the operator switches from the test mode TE to an auto mode A similarly to the first embodiment, and manipulates the "start" key 8d. In response to this, various command signals are outputted from the computer 7, so that welding by the body of the welding robot RO is executed. In advance of description of actual weaving welding operation, processes executed by the computer 7 and the operation of the body of the welding robot RO based on command outputs from the computer 7 are described while comparing the flow chart of FIG. 14 with FIG. 4 showing that of the first embodiment.

As understood from comparison of both figures, points at which the second embodiment is different from the first embodiment are:

(1) a point that a judgement as to whether or not the SEM No. is "99" (process 109) is executed in the second embodiment while the process 102 is executed in the first embodiment when it is judged that the corresponding step (corresponding step in FIG. 13) is sensing "S" in a process 101, (2) a point that amplitude variable weaving (process 109') according to the second embodiment is different from that of the first embodiment (process 109), and (3) a point that sensing in the height direction (process 107) is not executed.

Other points are identical to the first embodiment. Therefore, detailed description thereof is omitted here.

Figure 14:
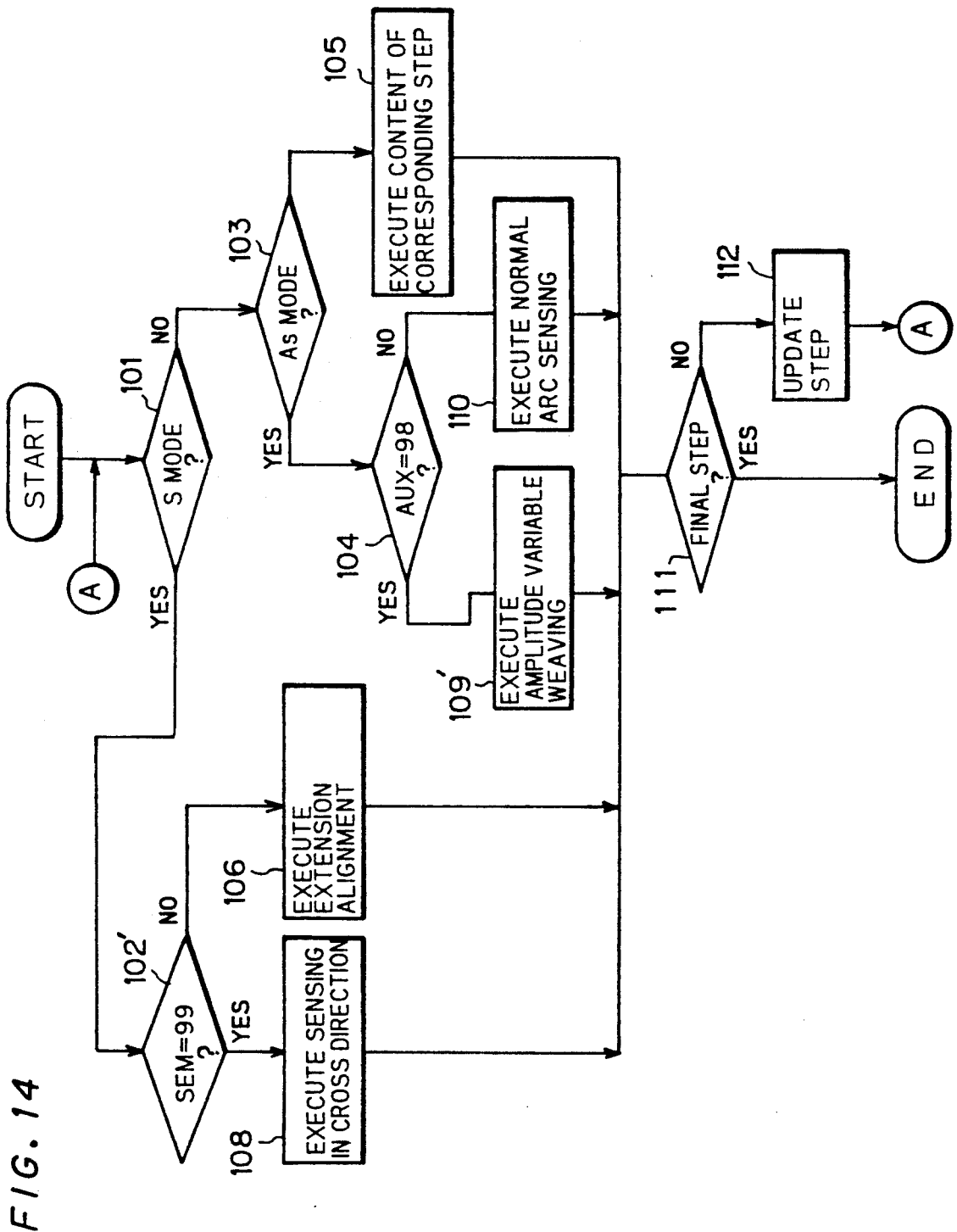
FIG. 14 is a flow chart showing the operation of the second embodiment.

Actual weaving welding operation performed in accordance with the flow chart of FIG. 14 on the basis of the teaching of FIG. 13 will now be described in due order. When the step data of FIG. 13 are applied to the aforementioned processing flow, the forward end of the torch 4 follows a locus F (except for sensing part) in FIG. 12. Namely, the forward end of the torch 4 is first located at the point $P_0$ (FIG. 1) in response to the data of the step No. 1, so that the aforementioned extension alignment is executed there on the basis of the data of the step No. 2. Then the forward end of the torch 4 moves to the first sensing start point $P_1$ by linear interpolation in response to the data of the step No. 3, so that the aforementioned sensing is executed there on the basis of the data of the step No. 4.

Then the forward end of the torch 4 moves to the point $P_2$ in response to the data of the step No. 5, and thereafter moves to the point $P_3$ by linear interpolation in response to the data of the step No. 6. Then it starts welding from the point $P_3$ on the basis of the data of the steps No. 6 to No. 8, and performs weaving welding while changing its amplitude as hereinafter described following changes of the interspace between horizontal plates W1 and W2 in the weld line direction. Since the point $P_4$ is designated as a dummy point by the F No. "7", the torch 4 is advanced neglecting this point. Thus, the forward end of the torch 4 performs weaving welding while successively widening its amplitude in FIG.

12, and moves to the retractive point $P_6$ by linear interpolation on the basis of the data of the step No. 9 upon completing the weaving welding at the point $P_5$, to terminate a series of welding processes.

(C-3) Amplitude Variable Weaving

Figure 15A:
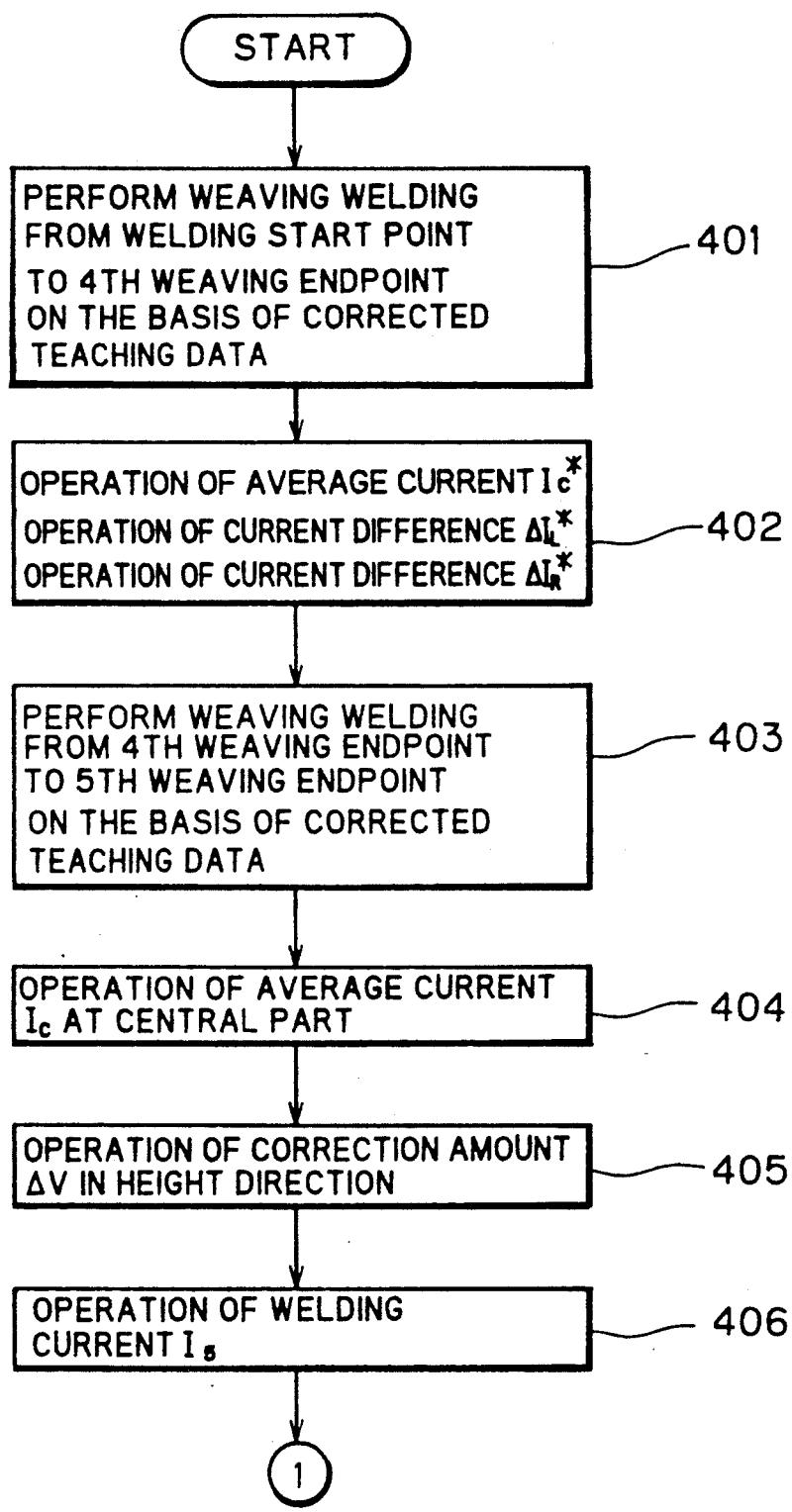
FIGS. 15A to 15C are flow charts of amplitude variable weaving according to the second embodiment.
Figure 15B:
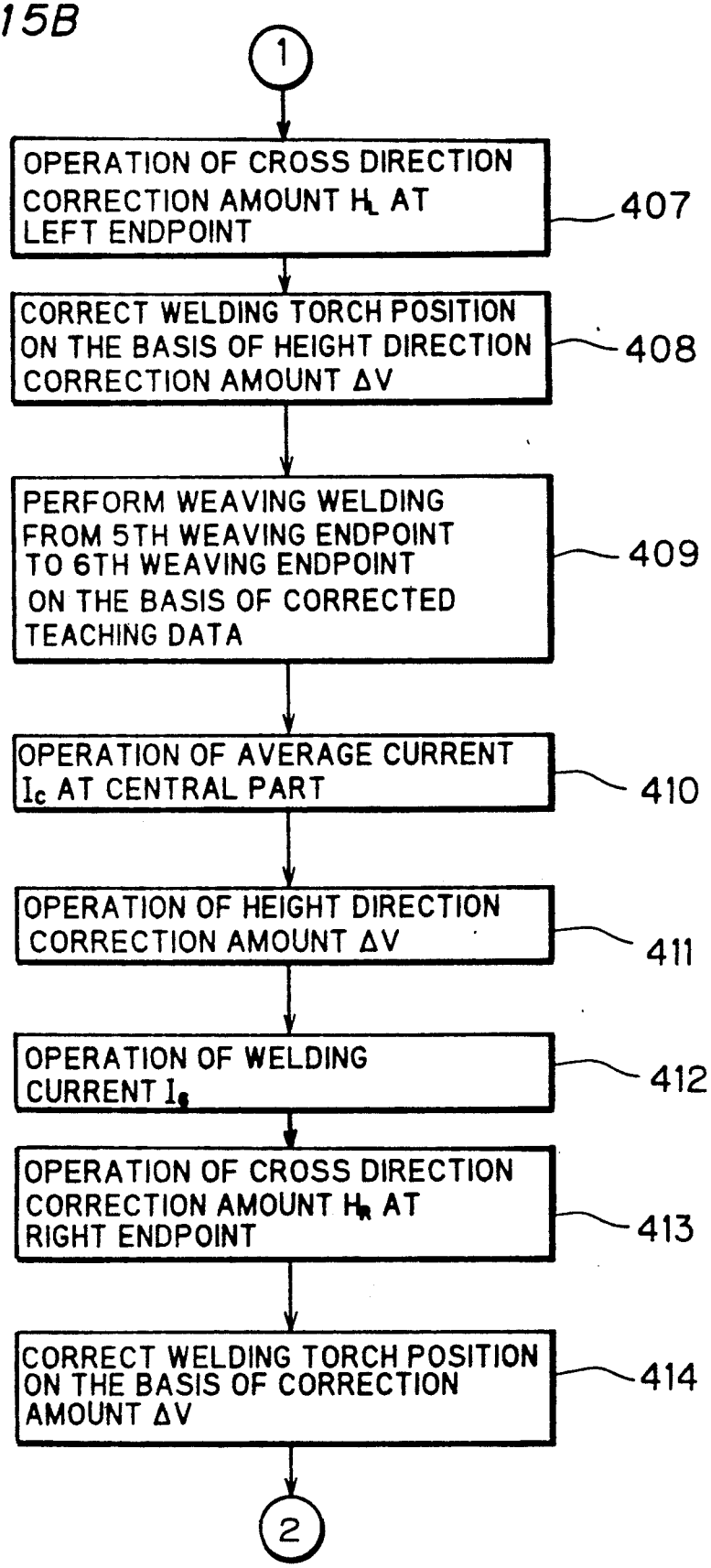
Figure 15C:
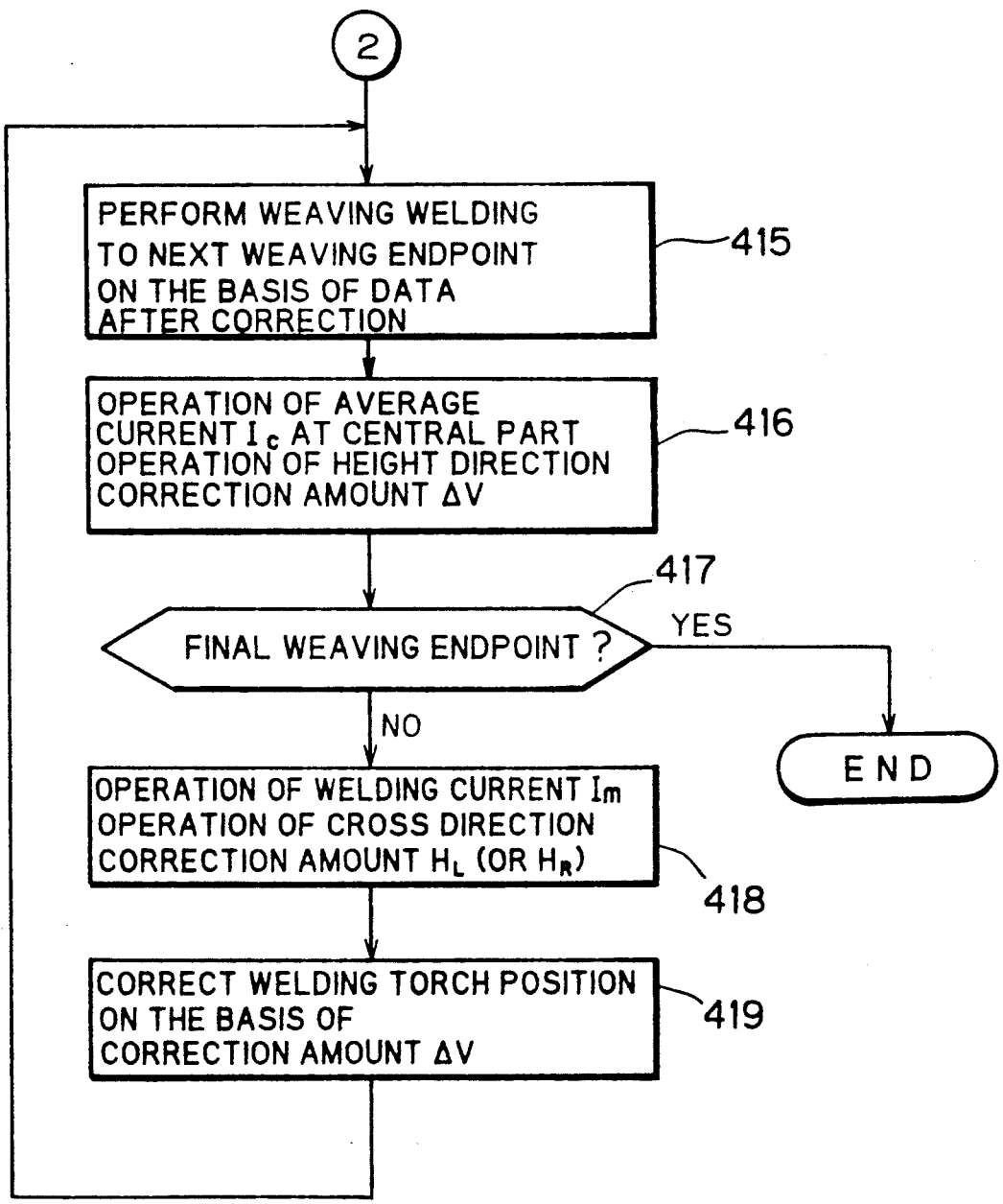
Figure 16:
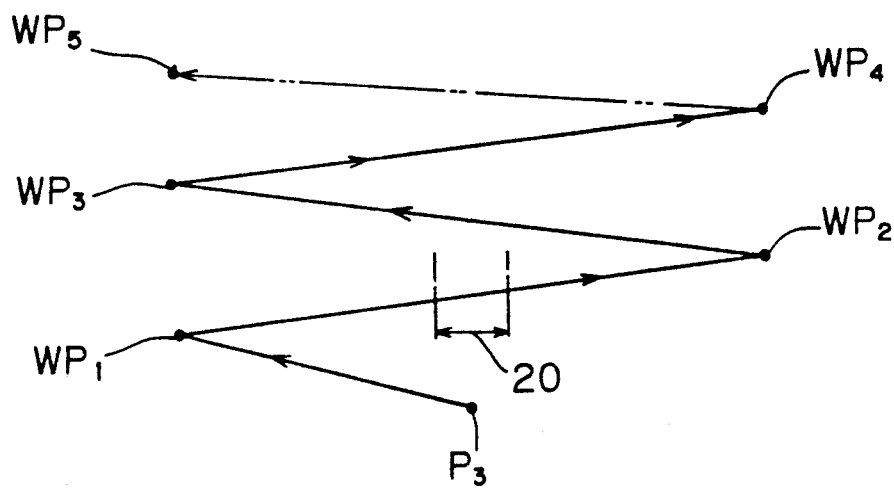
FIGS. 16a and 16b are explanatory diagrams for illustrating the above amplitude variable method.
Figure 16:
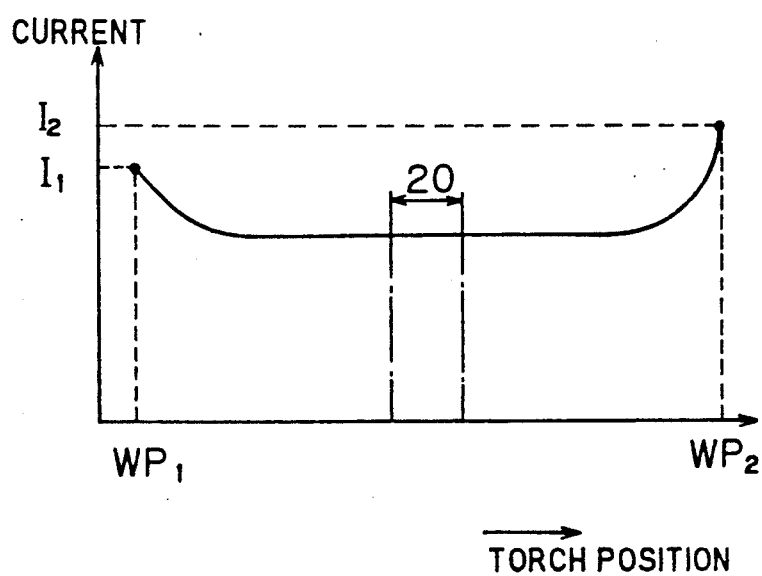

Amplitude variable weaving performed in the above process 109' will be described in detail with reference to FIGS. 15A, 15B, 15C and 16. FIGS. 15A to 15C are flow charts showing an amplitude varying method in this case. First, in response to a command from the computer 7, welding is executed from the welding start point $P_3$ in order of first to fourth weaving endpoints $WP_1$ to $WP_4$ (process 401). At this time, weaving welding is performed on the basis of the teaching data corrected in the process 108. Namely, positional data of the respective weaving endpoints $WP_1$ to $WP_4$ are operated respectively on the basis of data related to groove width and pitch (process 108), and a process 401 is executed on the basis of the positional data.

The computer 7 samples welding currents in the vicinity of the respective weaving endpoints $WP_1$ to $WP_4$ measured by the current sensor $5e$ of FIG. 1 every time it confirms that the torch 4 has reached the respective weaving endpoints $WP_1$ to $WP_4$ to evaluate welding currents $I_1$ to $I_4$ respectively, and stores the same in its memory.

When performing welding from the first weaving end point $WP_1$ to the second weaving end point $WP_2$, the computer samples a welding current in a constant time at a substantially intermediate position (hereinafter referred to as "central part": 20 in FIG. 16) between those endpoints $WP_1$ and $WP_2$, and thereafter operates the average value thereof, to store the result, i.e., an average current value $I_{C1}$ in the memory. Also when successively performing welding from the second weaving endpoint $WP_2$ to the third and fourth weaving endpoints $WP_3$ and $WP_4$, the computer 7 evaluates average current values $I_{C2}$ and $I_{C3}$ at the central part 20 respectively similarly to the above, and stores the same in the memory.

In a process 402, the computer 7 evaluates an average current $I_C^*$, current difference $\Delta I_L^*$ at left endpoints (odd weaving endpoints $WP_1$ and $WP_3$) and current difference $\Delta I_R^*$ at right endpoints (even weaving endpoints $WP_2$ and $WP_4$) in accordance with the following equations:

$$I_C^* = \frac{I_{C1} + I_{C2} + I_{C3}}{3} \tag{3}$$

$$\Delta I_L^* = I_L^* - I_C^* \tag{4}$$

where $$I_L^* = \frac{I_1 + I_3}{2}$$

$$\Delta I_R^* = I_R^* - I_C^* \tag{5}$$

where $$I_R^* = \frac{I_2 + I_4}{2}$$

Then, in response to a command from the computer 7, welding from the fourth weaving endpoint $WP_4$ to the fifth weaving end point $WP_5$ is executed on the basis of the corrected teaching data similarly to the process 401, as shown by the dashed-dotted-and-dotted line in FIG. 16(a) (process 403). While performing this welding, the computer 7 evaluates the average current $I_C$ at the central part 20 similarly to the above (process 404).

Assuming here that the torch height is maintained constant, the average current $I_C$ evaluated in the aforementioned manner substantially coincides with the average current $I_C^*$ evaluated in the process 402. If the torch height is different in welding in the process 401 and in welding in the process 403 to the contrary, the average current $I_C$ becomes a value different from the average current $I_C^*$. Namely, when the torch height is high, the average current $I_C$ becomes smaller than the average current $I_C^*$, while becoming larger than the same when the torch height is lower to the contrary. Therefore, the height position of the torch 4 can be deduced by comparing the average current I with current $I_C^*$.

Therefore, the amount of deviation (hereinafter referred to as "height direction correction amount $\Delta V$") in the height positions of the torch 4 in welding in the process 401 and in welding in the process 403 is evaluated by the computer 7 from the following equation before the torch 4 reaches the fifth weaving endpoint $WP_5$ or immediately after reaching (process 405):

$$\Delta V = a \cdot (I_C - I_C^*) \tag{6}$$

where a: constant

When the torch 4 reaches the fifth weaving endpoint $WP_5$, the computer 7 operates a welding current $I_5$ in the vicinity of the weaving endpoint $WP_5$ measured by the current sensor $5e$, and stores the same in its memory (process 406).

Figure 9B:
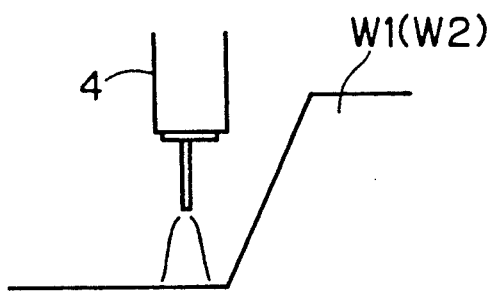
Figure 9C:
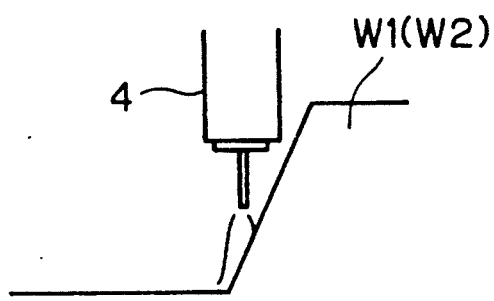

The positional relation between the torch 4 and the horizontal plates $W_1$ and $W_2$ can be correctly judged by comparing current difference $\Delta I_L$ between the current value $I_5$ and the average current $I_C$ with the current difference $\Delta I_L^*$ evaluated in the process 402. Namely, the torch 4 and the horizontal plate $W_1$ are in good positional relation in the welding in the process 401 as shown in FIG. 9A, and current difference at the left endpoints at that time is the current difference $\Delta I_L^*$. Therefore, assuming that the current difference $\Delta I_L$ is identical to the current difference $\Delta I_L^*$, it can be said that the torch 4 and the horizontal plate $W_1$ at that time are in good relation (FIG. 9A). When the aforementioned current difference $\Delta I_L$ is a value smaller than the current difference $\Delta I_L^*$, it is understood that the torch 4 is extremely separated from the horizontal plate $W_1$ (FIG. 9B). When it is a value larger than the current difference $\Delta I_L^*$, to the contrary, it is understood that the torch 4 is extremely close to the horizontal plate $W_1$ (FIG. 9C).

In the process 407, therefore, setting:

$$\Delta I_L = I_5 - I_C$$

to evaluate an amount of deviation (hereinafter referred to as "cross direction correction amount $H_L$") of the torch 4 in the cross direction at the left endpoints from the following equation:

$$H_L = b \cdot (\Delta I_L - \Delta I_L^*) \tag{7}$$

where c: constant

Then, in advance of welding from the fifth weaving endpoint $WP_5$ to a sixth weaving endpoint $WP_6$, the torch position is corrected on the basis of the height direction correction amount ΔV evaluated in the process 405 (process 408). Thus, subsequently performed welding can be performed similarly to the welding in the process 401 as to the height position relation of the torch.

Following it, welding from the fifth weaving endpoint WP$_5$ to the sixth weaving endpoint WP$_6$ is executed in response to a command from the computer 7 on the basis of the corrected teaching data similarly to the processes 401 and 403 (process 409). Also in this welding, the computer 7 evaluates an average current I$_C$ at the central part 20 similarly to the above (process 410), and further evaluates a height direction correction amount ΔV on the basis of the equation (6) to store the same in the memory (process 411).

When the torch 4 reaches the sixth weaving endpoint WP$_6$, the computer 7 measures a welding current I$_6$ in the vicinity of the sixth weaving endpoint WP$_6$ by the current sensor 5e, and stores the same in its memory (process 412).

Also at the right endpoints, the amount of deviation (hereinafter referred to as "cross direction correction amount H$_R$") of the torch 4 in the cross direction can be evaluated from large-small relation between current difference ΔI$_R$ (=I$_6$−I$_C$) at the right endpoints and the current difference ΔI$_R$*, similarly to the above. In a process 413, therefore, the computer 7 evaluates the cross direction correction amount H$_R$ on the basis of the following equation:

$$H_R = c \cdot (\Delta I_R - \Delta I_R^*) \qquad (8)$$

where c: constant

Further, similarly to the above process 408, the torch position is corrected on the basis of the height direction correction amount ΔV in advance of welding to a next weaving endpoint WP$_7$ (process 414).

Further, the position of the next weaving endpoint WP$_7$ is evaluated on the basis of the cross direction correction amount H$_L$ evaluated in the process 407. Assuming that the coordinates of the fifth weaving endpoint WP$_5$ are expressed by a coordinate value y$_5$ in the direction of a weld line WL and a coordinate value x$_5$ in a direction perpendicular to the weld line WL, for example, coordinates (x$_7$, y$_7$) of the seventh weaving point WP$_5$ are:

$$x_7 = x_5 + H_L$$

$$y_7 = y_7 + p$$

where p represents a welding pitch

Thereafter welding to the next weaving endpoint WP$_7$ is executed on the basis of the positional data of the weaving endpoint WP$_7$ evaluated in the aforementioned manner (process 415). Also in this welding, the computer 7 evaluates the average current I$_C$ and the height direction correction amount ΔV respectively (process 416).

In a process 417, the computer 7 discriminates whether the aforementioned weaving endpoint WP$_7$ is a final weaving endpoint WP$_e$ or not. If it discriminates that the same is the final weaving endpoint WP$_e$, welding from the final weaving endpoint WP$_e$ to the welding termination point P$_5$ is executed on the basis of the teaching data corrected in the process 108 in response to a command from the computer 7.

When discriminating that it is not the final weaving endpoint WP$_e$, the computer 7 operates a welding current I$_7$ in the vicinity of the weaving endpoint WP$_7$ similarly to the above, and evaluates the cross direction correction amount H$_L$ (process 418). Then, it corrects the torch position on the basis of the height direction correction amount ΔV evaluated in the process 416 in advance of welding to a next weaving endpoint WP$_8$ (process 419), and evaluates the position of the next weaving endpoint WP$_8$ on the basis of the cross direction correction amount H$_R$ evaluated in the process 413 similarly to the above, and thereafter welding to the weaving endpoint WP$_8$ is executed (process 415). These series of processes 415 to 419 are repeated until a discrimination of YES is made in the process 417.

According to this embodiment, as hereinabove described, welding currents in the vicinity of substantially intermediate positions between mutually continuous weaving endpoints (first and second weaving endpoints WP$_1$ and WP$_2$, for example) are evaluated and an average current value I$_C$* of these is evaluated, to regard this as the reference of adjustment of weaving width. Therefore, the average current value I$_C$* is hardly changed even if the groove width is changed, and accurate adjustment of weaving width can be performed on the basis of the value I$_C$*. Thus, it is possible to correctly change the weaving amplitude following changes of the interspace between the horizontal plates W1 and W2 in the weld line direction, so that neither too much nor too little weaving welding can be performed even if the interspace between welded bodies is ununiform along the weld line direction.

In this second embodiment, further, the position of a weaving endpoint after one cycle with respect to the current position of the welding torch 4 is regularly known, whereby it is easy to appropriately control the travel speed (i.e., welding progress speed) of the welding torch 4. Therefore, welding height constant control can be excellently performed by controlling the welding progress speed while maintaining the feed rate for the welding wire constant (while making the amount of melting of the consumable electrode (welding wire) 4a per unit time constant).

In addition to it, welding to a next weaving endpoint is executed after the torch position is corrected (processes 408, 414 and 419) on the basis of the height direction correction amount ΔV in advance of welding from a certain weaving endpoint to the next weaving endpoint in welding from the fourth weaving endpoint WP$_4$ to the final weaving endpoint WP$_e$, whereby the height of the torch 4 is regularly maintained constant.

Although correction of the torch position (processes 408, 414 and 419) is necessarily performed in welding from the fourth weaving endpoint WP$_4$ to the final weaving endpoint WP$_e$ in the aforementioned second embodiment, the aforementioned processes 408, 414 and 419 are not necessarily indispensable processes if it is compensated for that deviation of the torch 4 in the height direction is small. Further, sensing in the height direction (process 107) may be performed in advance of weaving welding similarly to the first embodiment, in place of performing correction of the torch position (processes 408, 414 and 419). In this case, a control algorithm can be further simplified in addition to an effect that the torch height can be maintained constant as hereinabove described.

Further, although the average current I$_C$*, and the current difference ΔI$_L$* and ΔI$_R$* are evaluated in the process 402 after welding is executed from the welding start point $P_3$ to the fourth weaving endpoint $WP_4$ (process 401) in the aforementioned second embodiment, it is not restricted to this. Namely, welding may be executed from the welding start point $P_3$ to an n-th ($n \geq 2$) weaving endpoint $WP_n$, to evaluate the average current $I_C^*$ and the current difference $\Delta I_L^*$ and $\Delta I_R^*$.

Further, although such change that the interspace is uniformly widened with forward progress as shown in FIGS. 1 and 2 in the aforementioned second embodiment, the present invention can also be applied to a workpiece (FIG. 11) whose interspace is ununiformly changed, similarly to the first embodiment. It is also applicable to a workpiece other than the horizontal plate.

Although the correction amounts $\Delta V$, $H_R$ and $H_L$ have been evaluated noting the welding currents in the aforementioned second embodiment, these correction amounts $\Delta V$, $H_R$ and $H_L$ may be evaluated on the basis of welding voltages in place of the welding currents, as a matter of course. Further, the welding currents and the welding voltages may be simultaneously measured to evaluate the correction amounts $\Delta V$, $H_R$ and $H_L$ from these.

Although description has been made as to the case of applying the present invention to single-layer swell welding in the above first and second embodiments, the present invention is also applicable to multilayer swell welding. For example, first-layer weaving welding may be performed in the aforementioned manner while storing positional data of respective weaving endpoints in the memory of the computer 7, to perform weaving welding after a second layer on the basis of the data stored in the memory. An effect similar to the above can be attained also in this case.

Although the present invention has been described in detail with reference to the embodiments shown in the drawings, the present invention is not restricted to the aforementioned embodiments. The scope of the present invention is to be defined by the following claims.

We claim:

1. A weld line profile control method of weaving welding bodies to be welded along a weld line on the basis of teaching data, said weld line profile control method including:
   (a) a step of evaluating at least one of a welding current and a welding voltage in a position close to a weaving endpoint as a reference value; and
   (b) a step comprising the following steps (b-1) to (b-4);
      (b-1) a step of actually measuring at least one of a welding current and a welding voltage in the vicinity of an n-th ($n \geq 2$) weaving endpoint, respectively,
      (b-2) a step of correcting a weaving width from an (n−1)-th weaving endpoint to the n-th weaving endpoint on the basis of difference between the actually measured value and the reference value,
      (b-3) a step of evaluating an (n+1)-th weaving endpoint position on the basis of the corrected weaving width, and
      (b-4) a step of performing weaving welding from the n-th weaving endpoint to the (n+1)-th weaving endpoint on the basis of the positional data.

2. A weld line profile control method in accordance with claim 1, further including a step of evaluating the distance between a welding torch and said welded body for correcting the teaching data on the basis of difference between said distance and a distance between said welding torch and a reference body in teaching.

3. A weld line profile control method in accordance with claim 1, wherein welding to the n-th weaving endpoint is performed on the basis of the teaching data and thereafter at least one of welding currents and welding voltages at respective positions close to weaving endpoints are actually measured to evaluate the average of those actually measured values, with the average then being used as said reference value.

4. A weld line profile control method of weaving welding bodies to be welded along said weld line while swinging a welding torch in a substantially orthogonal direction with respect to the weld line on the basis of teaching data supplied in advance of welding, said weld line profile control method including:
   (a) a step comprising the following steps (a-1) to (a-4);
      (a-1) a step of welding from a welding start point to an n-th ($n \geq 2$) weaving endpoint on the basis of the teaching data,
      (a-2) a step of evaluating an average value of at least one of welding currents and welding voltages in the vicinity of substantially intermediate portions between mutually continuous weaving endpoints as a first reference value;
      (a-3) a step of evaluating an average value of at least one of welding currents and welding voltages in the vicinity of odd weaving endpoints and further evaluating difference between the average value and the first reference value as a second reference value, and
      (a-4) a step of evaluating an average value of at least one of welding currents and welding voltages in the vicinity of even weaving endpoints and further evaluating difference between the average value and the first reference value as a third reference value,
   (b) a step of actually measuring at least one of a welding current and a welding voltage in the vicinity of a substantially intermediate portion between an i-th ($i \geq n$) weaving endpoint and an (i+1)-th weaving endpoint as a first actually measured value and actually measuring at least one of a welding current and a welding voltage in the vicinity of an (i+1)-th weaving endpoint as a second actually measured value;
   (c) a step of evaluating an amount of difference between the first and second actually measured values and thereafter correcting positional data of an (i+3)-th weaving endpoint on the basis of difference between the amount of difference and the second reference value when a value (i+1) is an odd number while correcting positional data of the (i+3)-th weaving endpoint on the basis of difference between the amount of difference and the third reference value in the case of an even number; and
   (d) a step of weaving welding from the (i+2)-th weaving endpoint to the (i+3)-th weaving endpoint on the basis of the corrected positional data.

5. A weld line profile control method in accordance with claim 4, further including a step of evaluating the distance between said welding torch and said body in advance of weaving welding of said welded body and correcting the teaching data on the basis of difference between the distance and the distance between said welding torch and a reference body in teaching.

6. A weld line profile control method in accordance with claim 4, further including a step of coinciding a space between said welding torch and said body with the teaching data on the basis of difference between the first actually measured value and the first reference value in advance of welding from a j-th ($j \geq n$) weaving endpoint to a (j+1)-th weaving endpoint.

* * * * *